(12) United States Patent  
Zheng

(10) Patent No.: US 10,674,240 B2  
(45) Date of Patent: Jun. 2, 2020

(54) PROTECTION SWITCHING METHOD AND NODE

(71) Applicant: Huawei Technologies Co., Ltd., Shenzhen (CN)

(72) Inventor: Haomian Zheng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/038,531

(22) Filed: Jul. 18, 2018

(65) Prior Publication Data

US 2018/0324505 A1 Nov. 8, 2018

Related U.S. Application Data

(63) Continuation of application No. PCT/CN2017/071192, filed on Jan. 14, 2017.

(30) Foreign Application Priority Data

Jan. 19, 2016 (CN) .......................... 2016 1 0034671

(51) Int. Cl.
*G02F 1/00* (2006.01)
*H04Q 11/00* (2006.01)
(Continued)

(52) U.S. Cl.
CPC ....... *H04Q 11/0062* (2013.01); *H04B 10/038* (2013.01); *H04J 3/085* (2013.01);
(Continued)

(58) Field of Classification Search
CPC ....... H04B 10/38; H04B 10/038; H04J 14/02; H04J 14/0227; H04J 14/0228;
(Continued)

(56) References Cited

U.S. PATENT DOCUMENTS 8,787,750 B2 7/2014 Zi
2004/0190443 A1* 9/2004 Kitamori ............... H04J 3/14
370/222

(Continued)

FOREIGN PATENT DOCUMENTS

CN 102013922 A 4/2011
CN 102098123 A 6/2011
(Continued)

OTHER PUBLICATIONS

"Discussion on APS of Shared Mesh Protection," Source: Huawei Technologies, China, Telefonica Investigacion y Desarrollo, Spain, China Unicom, International Telecommunication Union, Telecommunication Standardization Sector, Study Period 2009-2012, COM 15-C 1082-E, May 2010, 12 pages.

(Continued)

*Primary Examiner* — Hanh Phan
(74) *Attorney, Agent, or Firm* — Slater Matsil, LLP

(57) ABSTRACT

A protection switching method, including sending, by a first end node, a first protection switching request message to an intermediate node in response to a fault occurring on a working trail between the first end node and a second end node, wherein a protection trail of the working trail comprises the first end node, the second end node, and at least one intermediate node, receiving, by the first end node, a second protection switching request message from the intermediate node, and switching service data to the protection trail for transmission in response to receiving the second protection switching request message, where one overhead frame of each of the first and second protection switching request messages has at least two overhead information groups, and each of the at least two overhead information groups comprises a request type field, a request signal identifier field, and a bridge flag field.

20 Claims, 18 Drawing Sheets

(51) Int. Cl.
*H04B 10/038* (2013.01)
*H04L 12/703* (2013.01)
*H04J 3/08* (2006.01)
*H04J 3/14* (2006.01)
*H04J 3/16* (2006.01)

(52) U.S. Cl.
CPC .............. *H04J 3/14* (2013.01); *H04J 3/1652* (2013.01); *H04L 45/28* (2013.01); *H04J 2203/006* (2013.01); *H04Q 2011/0081* (2013.01); *H04Q 2011/0088* (2013.01)

(58) Field of Classification Search
CPC ...... H04J 14/0282; H04J 3/085; H04J 3/1652; H04Q 11/0066; H04Q 11/0062; H04Q 11/0067; H04Q 11/0003; H04Q 11/0005; H04L 45/22; H04L 12/26
USPC ........ 398/2, 3, 4, 5, 7, 8, 79, 83, 45, 48, 49, 398/50, 51, 53, 56, 57, 33, 25, 38, 10, 13, 398/17, 58; 370/216, 217, 222, 225, 228, 370/254, 221, 401, 352, 389, 392
See application file for complete search history.

(56) References Cited

U.S. PATENT DOCUMENTS

| | | | |
|---|---|---|---|
| 2007/0292129 A1* | 12/2007 | Yan | H04B 10/032 398/5 |
| 2008/0107416 A1 | 5/2008 | Wang | |
| 2009/0003326 A1 | 1/2009 | Ozaki | |
| 2009/0109843 A1 | 4/2009 | Yang | |
| 2009/0303996 A1 | 12/2009 | Takase et al. | |
| 2010/0135291 A1 | 6/2010 | Martin et al. | |
| 2013/0071117 A1 | 3/2013 | Pan et al. | |
| 2015/0186216 A1 | 7/2015 | Lee | |
| 2015/0334004 A1* | 11/2015 | Hussain | H04L 1/0042 398/5 |
| 2016/0020850 A1* | 1/2016 | Youn | H04B 10/032 398/5 |

FOREIGN PATENT DOCUMENTS

| | | |
|---|---|---|
| CN | 102457435 A | 5/2012 |
| CN | 102868544 A | 1/2013 |
| CN | 103200467 A | 7/2013 |
| CN | 103313148 A | 9/2013 |
| CN | 104067539 A | 9/2014 |
| CN | 104158586 A | 11/2014 |
| CN | 105721045 A | 6/2016 |
| EP | 2827506 B1 | 4/2018 |
| JP | 2009296493 A | 12/2009 |
| KR | 20150077265 A | 7/2015 |
| WO | 2012055168 A1 | 5/2012 |

OTHER PUBLICATIONS

"Optical Transport Network (OTN): Linear Protection," Series G: Transmission Systems and Media, Digital Systems and Networks, Digital Networks—Optical Transport Networks, ITU-T, Telecommunication Standardization Sector of ITU, G.873.1, May 2014, 36 pages.

* cited by examiner

| Request Type | Request Signal ID | BF | Resv | Request Type | Request Signal ID | BF | Resv |

| SF 1100 | W1 (such as 00000001) | 1 | 1 | Resv | 0 (0000) | 0 (00000000) | 0 | 0 | Resv |

FIG. 7a

| 0<br>0000 | 0<br>(00000000) | 0 | 0 | Resv | SF<br>1100 | W1<br>(For example, 00000001) | 1 | 1 | Resv |

FIG. 7b

| SF 1100 | W1 (such as 00000001) | 1 | Resv | 1 | SF 1100 | W1 (For example, 00000001) | 1 | Resv |

FIG. 8

| SF 1100 | W1 (such as 00000001) | 1 | Resv | SF 1100 | W2 (For example, 00000010) | 1 | Resv |

FIG. 9

| NR 0000 | W1 (such as 00000001) | 0 | 1 | Resv | NR 0000 | W1 (For example, 00000001) | 0 | 1 | Resv |
|---|---|---|---|---|---|---|---|---|---|

FIG. 11

| SF 1100 | W2 (For example, 00000010) | 1 | 0 | Resv | 0 (0000) | 0 (00000000) | 0 | 0 | Resv |

FIG. 13

PROTECTION SWITCHING METHOD AND NODE

CROSS-REFERENCE TO RELATED APPLICATIONS

This application is a continuation of International Application No. PCT/CN2017/071192, filed on Jan. 14, 2017, which claims priority to Chinese Patent Application No. 201610034671.9, filed on Jan. 19, 2016. The disclosures of the aforementioned applications are hereby incorporated by reference in their entireties.

TECHNICAL FIELD

The present disclosure relates to the field of communications technologies, and specifically, to an optical transport network protection switching method and a node.

BACKGROUND

Conventional optical transport networks are mainly in a ring or linear topology, and can provide a series of protection technologies such as multiplex section protection, channel ring protection, linear 1:1 multiplex section protection, linear 1+1 multiplex section protection, and end-to-end subnetwork connection protection (SNCP). When a conventional optical network protection technology can provide protection against a single-link fault, a protection resource that needs to be reserved in the conventional optical network protection technology occupies a large quantity of network bandwidth resources, causing low bandwidth utilization.

With the development of telecommunications technologies, a shared mesh protection (SMP) technology based on an automatically switched optical network (ASON) emerges. A most noticeable difference between the SMP technology and the conventional optical network protection technology is as follows. In the SMP technology, dynamic real-time trail recovery can be provided, without reserving a bandwidth resource for a protection trail, and real-time calculation can be performed based on a failed link or a failed node after a fault occurs, to determine the protection trail. In the SMP technology, to reduce a protection switching time, a protection switching message may be transferred by using an automatic protection switching (APS) overhead, so that protection switching of an entire service is implemented.

The International Telecommunication Union-Telecommunication Standardization Sector (ITU-T) G.ODUSMP standard specifies an APS overhead encoding format for implementing SMP protection switching. As shown in FIG. 1, FIG. 1 shows an APS overhead encoding format in the prior art. An overhead part of an APS message may be used to describe an SMP protection switching status, includes a total of 4 bytes that are equal to 32 bits, and describes the following three types of information.

A (1) Request is included in the $1^{st}$ bit to the $4^{th}$ bit, and represents a protection switching request type such as SF (Signal Failure), SD (Signal Degrade), RR (Reverse Request), NR (No Request), MS (Manual Switch), and FS (Forced Switch).

A (2) Requested Signal is included in the $9^{th}$ bit to the $16^{th}$ bit, represents a service ID (Identifier), for example, W1, of a service that requests a shared protection resource, and is set to all zeros when there is no request.

(3) Bridged Signal is included in the $17^{th}$ bit to the $24^{th}$ bit, represents a service ID, for example, W1, of a service for which bridging has been completed, and is set to all zeros when there is no service for which bridging has been completed.

For a definition of the foregoing encoding format, refer to the ITU-T G.ODUSMP standard. It can be seen from the encoding format in FIG. 1 that, because valid fields occupy only 20 bits and reserved fields occupy 12 bits, overhead field is not fully used, causing overhead resource waste.

SUMMARY

In view of this, embodiments of the present disclosure provide a protection switching method and a node, to resolve a problem of overhead resource waste.

According to a first aspect, an embodiment of the present disclosure provides a protection switching method, including, when a fault occurs on a working trail between a first end node and a second end node, sending, by the first end node, a first protection switching request message to an intermediate node, where a protection trail of the working trail includes the first end node, the second end node, and at least one intermediate node, and receiving, by the first end node, a second protection switching request message from the intermediate node, and switching service data to the protection trail for transmission, where one overhead frame of the first protection switching request message and the second protection switching request message includes at least two overhead information groups, and the overhead information group includes a request type field, a request signal identifier field, and a bridge flag field, where the request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

In this embodiment of the present disclosure, because one overhead frame may include two overhead information groups, to indicate overhead information of two timeslots, an overhead field is fully used, so that protection switching efficiency is improved.

With reference to the first aspect, in a first possible implementation of the first aspect, the overhead information group further includes a request flag field, where the request flag field is used to indicate whether the service corresponding to the service identifier indicated by the request signal identifier field requests the protection resource.

In this embodiment of the present disclosure, one overhead frame may include two overhead groups, and the request flag field is set in the overhead groups, to indicate whether the service corresponding to the service identifier of the overhead groups requests the protection resource, so that an overhead resource is fully used.

With reference to the first aspect or the first possible implementation of the first aspect, in a second possible implementation of the first aspect, the request type field occupies 4 bits, the request signal identifier field occupies 8 bits, 9 bits, or 10 bits, the request flag field occupies 1 bit, and the bridge flag field occupies 1 bit.

In an APS overhead, the request signal identifier field may occupy 8 to 10 bits, so that an APS overhead field is fully used.

With reference to any one of the first aspect, or the first and the second possible implementations of the first aspect, in a third possible implementation of the first aspect, before sending the first protection switching request message, the first end node completes bridging between the first end node and the intermediate node.

With reference to any one of the first aspect, or the first to the third possible implementations of the first aspect, in a fourth possible implementation of the first aspect, after receiving the second protection switching request message, the first end node establishes a selector between the first end node and the intermediate node.

With reference to any one of the first aspect, or the first to the fourth possible implementations of the first aspect, in a fifth possible implementation of the first aspect, when the first end node detects that a fault is removed from a first working trail, the method further includes sending, by the first end node, a third protection switching request message to the intermediate node, and receiving, by the first end node, a fourth protection switching request message from the intermediate node, and switching the service data to the working trail for transmission, where one overhead frame of the third protection switching request message and the fourth protection switching request message includes at least two overhead information groups, and a request type field in the overhead information group indicates that the fault is removed from the working trail of the service corresponding to the service identifier indicated by the request signal identifier field.

In this embodiment of the present disclosure, because one overhead frame may include two overhead information groups, to indicate overhead information of two timeslots, an overhead field is fully used, so that protection switching efficiency is improved.

According to a second aspect, an embodiment of the present disclosure provides a protection switching method, including, when a fault occurs on a working trail between a first end node and a second end node, receiving, by an intermediate node, a first protection switching request message from the first end node, where a protection trail of the working trail includes the first end node, the second end node, and at least one intermediate node, sending, by the intermediate node, the first protection switching request message to a downstream adjacent node of the intermediate node, receiving, by the intermediate node, a second protection switching request message from the downstream adjacent node of the intermediate node, and sending, by the intermediate node, a second protection switching request message to the first end node, where one overhead frame of the first protection switching request message and the second protection switching request message includes at least two overhead information groups, and the overhead information group includes a request type field, a request signal identifier field, and a bridge flag field, where the request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

In this embodiment of the present disclosure, because one overhead frame may include two overhead information groups, to indicate overhead information of two timeslots, an overhead field is fully used, so that protection switching efficiency is improved.

With reference to the implementation of the second aspect, in a first possible implementation of the second aspect, the overhead information group further includes a request flag field, where the request flag field is used to indicate whether the service corresponding to the service identifier indicated by the request signal identifier field requests the protection resource.

In this embodiment of the present disclosure, one overhead frame may include two overhead groups, and the request flag field is set in the overhead information group, to indicate whether the service corresponding to the service identifier of the overhead information group requests the protection resource, so that an overhead resource is fully used.

With reference to the second aspect or the first possible implementation of the second aspect, in a second possible implementation of the second aspect, the request type field occupies 4 bits, the request signal identifier field occupies 8 bits, 9 bits, or 10 bits, the request flag field occupies 1 bit, and the bridge flag field occupies 1 bit.

In an APS overhead, the request signal identifier field may occupy 8 to 10 bits, so that an APS overhead field is fully used.

With reference to any one of the second aspect, or the first and the second possible implementations of the second aspect, in a third possible implementation of the second aspect, after receiving the first protection switching request message from the first end node, the intermediate node completes bridging between the intermediate node and the downstream adjacent node of the intermediate node.

With reference to any one of the second aspect, or the first to the third possible implementations of the second aspect, in a fourth possible implementation of the second aspect, after receiving the second protection switching request message from the downstream adjacent node of the intermediate node, the intermediate node establishes a selector between an upstream adjacent node of the intermediate node and the intermediate node.

According to a third aspect, an embodiment of the present disclosure provides a protection switching method, including, when a fault occurs on a working trail between a first end node and a second end node, receiving, by the second end node, a first protection switching request message from an intermediate node, where a protection trail of the working trail includes the first end node, the second end node, and at least one intermediate node, and sending, by the second end node, a second protection switching request message to the intermediate node, where one overhead frame of the first protection switching request message and the second protection switching request message includes at least two overhead information groups, and the overhead information group includes a request type field, a request signal identifier field, and a bridge flag field, where the request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

In this embodiment of the present disclosure, because one overhead frame may include two overhead information groups, to indicate overhead information of two timeslots, an overhead field is fully used, so that protection switching efficiency is improved.

With reference to the implementation of the third aspect, in a first possible implementation of the third aspect, the overhead information group further includes a request flag field, where the request flag field is used to indicate whether the service corresponding to the service identifier indicated by the request signal identifier field requests the protection resource.

In this embodiment of the present disclosure, one overhead frame may include two overhead groups, and the request flag field is set in the overhead information group, to indicate whether the service corresponding to the service identifier of the overhead information group requests the protection resource, so that an overhead resource is fully used.

With reference to the third aspect or the first possible implementation of the third aspect, in a second possible implementation of the third aspect, the request type field occupies 4 bits, the request signal identifier field occupies 8 bits, 9 bits, or 10 bits, the request flag field occupies 1 bit, and the bridge flag field occupies 1 bit.

In an APS overhead, the request signal identifier field may occupy 8 to 10 bits, so that an APS overhead field is fully used.

With reference to any one of the third aspect, or the first and the second possible implementations of the third aspect, in a third possible implementation of the third aspect, after receiving the first protection switching request message from the intermediate node, the second end node establishes a selector between the intermediate node and the second end node.

With reference to any one of the third aspect, or the first and the third possible implementations of the third aspect, in a fourth possible implementation of the third aspect, before sending the second protection switching request message to the intermediate node, the second end node establishes a bridge between the second end node and the intermediate node.

According to a fourth aspect, an embodiment of the present disclosure provides a first end node, including a sending module, configured to when a fault occurs on a working trail between the first end node and a second end node, send a first protection switching request message to an intermediate node, where a protection trail of the working trail includes the first end node, the second end node, and at least one intermediate node, and a receiving module, configured to receive a second protection switching request message from the intermediate node, and switch service data to the protection trail for transmission, where one overhead frame of the first protection switching request message and the second protection switching request message includes at least two overhead information groups, and the overhead information group includes a request type field, a request signal identifier field, and a bridge flag field, where the request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

In this embodiment of the present disclosure, because one overhead frame may include two overhead information groups, to indicate overhead information of two timeslots, an overhead field is fully used, so that protection switching efficiency is improved.

With reference to the implementation of the fourth aspect, in a first possible implementation of the fourth aspect, the overhead information group further includes a request flag field, where the request flag field is used to indicate whether the service corresponding to the service identifier indicated by the request signal identifier field requests the protection resource.

In this embodiment of the present disclosure, one overhead frame may include two overhead groups, and the request flag field is set in the overhead information group, to indicate whether the service corresponding to the service identifier of the overhead information group requests the protection resource, so that an overhead resource is fully used.

According to a fifth aspect, an embodiment of the present disclosure provides an intermediate node, including a receiving module, configured to when a fault occurs on a working trail between a first end node and a second end node, receive a first protection switching request message from the first end node, where a protection trail of the working trail includes the first end node, the second end node, and at least one intermediate node, and a sending module, configured to send the first protection switching request message to a downstream adjacent node of the intermediate node, where the receiving module is configured to receive a second protection switching request message from the downstream adjacent node of the intermediate node, and the sending module is configured to send a second protection switching request message to the first end node, where one overhead frame of the first protection switching request message and the second protection switching request message includes at least two overhead information groups, and the overhead information group includes a request type field, a request signal identifier field, and a bridge flag field, where the request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

In this embodiment of the present disclosure, because one overhead frame may include two overhead information groups, to indicate overhead information of two timeslots, an overhead field is fully used, so that protection switching efficiency is improved.

With reference to the implementation of the fifth aspect, in a first possible implementation of the fifth aspect, the overhead information group further includes a request flag field, where the request flag field is used to indicate whether the service corresponding to the service identifier indicated by the request signal identifier field requests the protection resource.

In this embodiment of the present disclosure, one overhead frame may include two overhead groups, and the request flag field is set in the overhead information group, to indicate whether the service corresponding to the service identifier of the overhead information group requests the protection resource, so that an overhead resource is fully used.

According to a sixth aspect, an embodiment of the present disclosure provides a second end node, including a receiving module, configured to when a fault occurs on a working trail between a first end node and the second end node, receive a first protection switching request message from an intermediate node, where a protection trail of the working trail includes the first end node, the second end node, and at least one intermediate node, and a sending module, configured to send, a second protection switching request message to the intermediate node, where one overhead frame of the first protection switching request message and the second protection switching request message includes at least two overhead information groups, and the overhead information group includes a request type field, a request signal identifier field, and a bridge flag field, where the request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

In this embodiment of the present disclosure, because one overhead frame may include two overhead information groups, to indicate overhead information of two timeslots, an overhead field is fully used, so that protection switching efficiency is improved.

With reference to the implementation of the sixth aspect, in a first possible implementation of the sixth aspect, the overhead information group further includes a request flag field, where the request flag field is used to indicate whether the service corresponding to the service identifier indicated by the request signal identifier field requests the protection resource.

In this embodiment of the present disclosure, one overhead frame may include two overhead groups, and the request flag field is set in the overhead information group, to indicate whether the service corresponding to the service identifier of the overhead information group requests the protection resource, so that an overhead resource is fully used.

According to a seventh aspect, an embodiment of the present disclosure provides an OTN device, including a main control board, a tributary board, a cross-connect board, and a line board, where the main control board runs a pre-configured program, and controls any one or more boards of the tributary board, the cross-connect board, or the line board, to execute the method according to any one of the first aspect or the possible implementations of the first aspect, the method according to any one of the second aspect or the possible implementations of the second aspect, and the method according to any one of the third aspect or the possible implementations of the third aspect.

According to an eighth aspect, an embodiment of the present disclosure provides a network system, including the node according to any one of the fourth aspect or the possible implementation of the fourth aspect and the node according to any one of the fifth aspect or the possible implementation of the fifth aspect.

According to a ninth aspect, an embodiment of the present disclosure provides a network system, including the node according to either of the fifth aspect or the possible implementation of the fifth aspect and the node according to either of the sixth aspect or the possible implementation of the sixth aspect.

According to the technical solutions provided in the present disclosure, in a process in which nodes such as the first end node, the intermediate node, and the second end node perform protection switching, one overhead frame of a protection switching request message includes at least two overhead information groups, and one overhead information group includes a request type field, a request signal identifier field, and a bridge flag field, where the request type field indicates a fault type of the working trail, the request signal identifier field indicates a service identifier of a service that requests a protection resource, and the bridge flag bit field indicates whether the protection resource corresponding to the service identifier indicated by the request signal identifier field has been bridged. An APS overhead encoding format provided in the embodiments of the present disclosure is used, and because one overhead frame can indicate overheads of two timeslots, an overhead field is fully used, so that service protection switching efficiency is improved.

BRIEF DESCRIPTION OF THE DRAWINGS

The following briefly describes the accompanying drawings required for describing the background and the embodiments.

FIG. 5b is a schematic diagram of an APS overhead encoding format according to an embodiment of the present disclosure;

FIG. 5c is a schematic diagram of an APS overhead encoding format according to an embodiment of the present disclosure;

FIG. 7a is a schematic diagram of an APS overhead encoding format according to an embodiment of the present disclosure;

FIG. 7b is a schematic diagram of an APS overhead encoding format according to an embodiment of the present disclosure;

FIG. 8 is a schematic diagram of another APS overhead encoding format according to an embodiment of the present disclosure;

FIG. 9 is a schematic diagram of another APS overhead encoding format according to an embodiment of the present disclosure;

FIG. 11 is a schematic diagram of an overhead encoding format of an NR (W1, 0, 1) message according to an embodiment of the present disclosure;

FIG. 13 is a schematic diagram of an overhead encoding format of an SF (W2, 1, 0) message according to an embodiment of the present disclosure;

DETAILED DESCRIPTION OF ILLUSTRATIVE EMBODIMENTS

The following describes the embodiments of the present disclosure with reference to the accompanying drawings.

Figure 2:
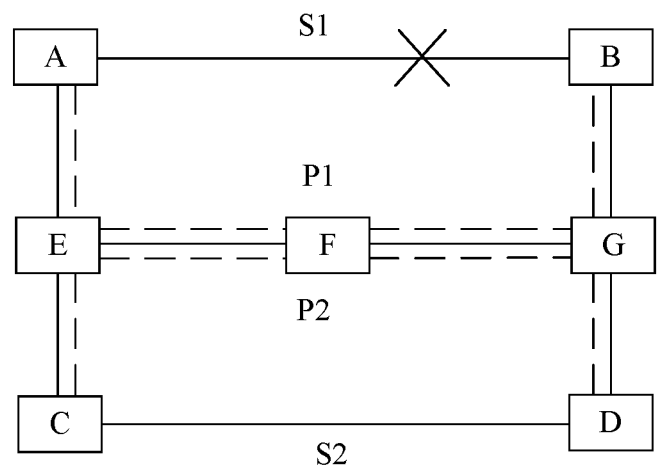
FIG. 2 is a schematic diagram of an SMP network topology structure according to an embodiment of the present disclosure.

SMP allows a protection resource to be shared by a plurality of working trails, and the plurality of working trails do not need to have a same source node and a same sink node. FIG. 2 is a schematic diagram of an SMP network topology structure according to an embodiment of the present disclosure. S1 and S2 are two working trails, and the trails S1 and S2 are respectively A-B and C-D. P1 is a protection trail of S1, and the trail P1 is A-E-F-G-B. P2 is a protection trail of S2, and of the trail P2 is C-E-F-G-D. A trail of a shared protection resource of S1 and S2 is E-F-G. The protection resource includes a resource such as a node, a link, or a bandwidth. A service ID of a service corresponding to S1 and P1 is W1, and a service ID of a service corresponding to S2 and P2 is W2. When a fault occurs on a working trail, a protection switching procedure is triggered, so that a service on the working trail is switched to a protection trail. For example, when a fault occurs on the working trail S1, the service on S1 may be switched to the protection trail P1.

To implement protection switching of a service, an APS (Automatic Protection Switched, automatic protection switching) overhead needs to be configured for a protection trail that bears the service. The APS overhead may represent an overhead of a plurality of protection switching types, such as SMP, 1+1 protection, 1:1 protection, and linear protection. An APS message carrying the APS overhead is used to represent a protection switching signaling message, such as an SMP protection switching signaling message, and one frame of every eight frames of APS overheads indicates an SMP protection switching signaling message. A link granularity of the APS overhead depends on a link granularity of a protection trail that bears a service on a faulty working trail. APS overheads with different link granularities are corresponding to different transmission bandwidths and timeslot resource quantities, but have a same APS overhead encoding format. In an Optical Transport Network (OTN), a smallest link granularity is Optical channel Data Unit (ODU) 0 whose bandwidth is 1.25 G and that occupies one timeslot resource. Other link granularities may include ODU1, ODU2, ODU3, and ODU4 whose bandwidths are respectively 2.5 G, 10 G, 40 G, and 100 G and that respectively occupy 2, 8, 32, and 80 timeslot resources. For example, when an ODU2 link is used to protect a service in an ODU0 link, during protection switching, one of eight timeslots is used, and an overhead of the ODU2 should be used.

Figure 1:
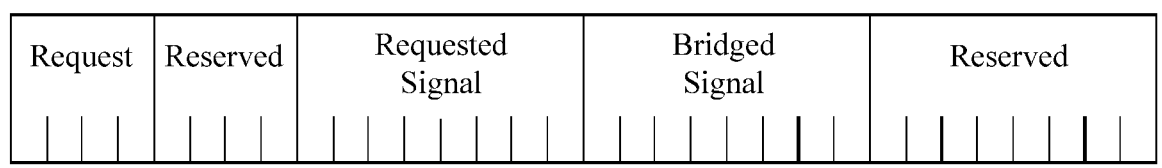
FIG. 1 is a schematic diagram of an APS overhead encoding format in the prior art.
Figure 3:
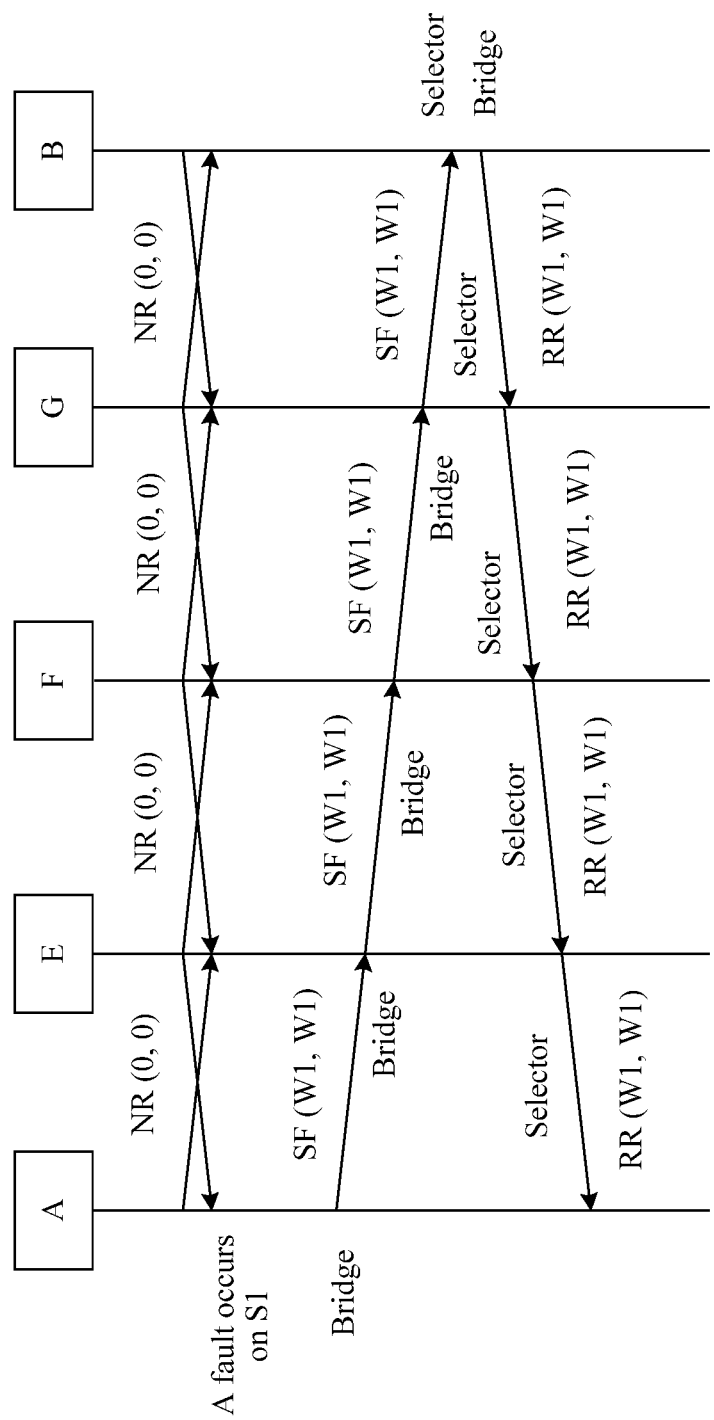
FIG. 3 is a signaling flowchart of protection switching implemented by using an APS overhead encoding format in the prior art.
Figure 4:
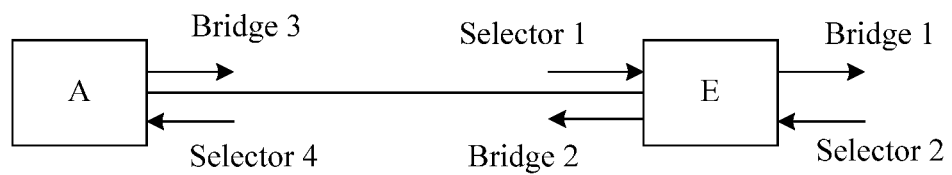
FIG. 4 is a schematic structural diagram of a connection between a node A and a node E according to an embodiment of the present disclosure.

In the prior art, signaling transfer of protection switching is performed by using an APS overhead encoding format shown in FIG. 1. FIG. 3 is a signaling flowchart of protection switching implemented by using an APS overhead encoding format in the prior art. As shown in FIG. 3, in the network topology structure shown in FIG. 2, when it is detected that a fault occurs on S1, the protection trail P1, A-E-F-G-B, of S1 needs to be activated. In a process of activating the protection trail of S1, bridging and selecting are performed in a node processing procedure. Specifically, bridging means activating a node for sending data, and selecting means activating a node for receiving data. As shown in FIG. 4, for an intermediate node E, a bridge and a selector each have two directions. A bridge 1 and a bridge 2 represent data sending in two directions, and a selector 1 and a selector 2 represent data receiving in two directions. The bridge 1 and the selector 1 represent data transmission in one direction, and the bridge 2 and the selector 2 represent data transmission in the other direction. For an end node A, a bridge and a selector each have only one direction, and the bridge and the selector are in reverse directions. For example, a bridge between E and A is established on the node E, that is, the bridge 2 is established on the node E, to send data to the node A; and a selector between A and E is established on the node E, that is, the selector 1 is established on the node E, to receive data from the node A. For a unidirectional service, the end node A has a bridge or a selector (the bridge 3 or the selector 4) only in one direction, the intermediate node E has a bridge and a selector (the bridge 1 and the selector 1, or the bridge 2 and the selector 2) in one direction. For a bidirectional service, the end node A has the bridge 3 and the selector 4, and the intermediate node E has bridges and selectors in two directions. End nodes include a source node and a sink node, and the intermediate node is a node having at least one adjacent node.

A signaling transfer direction may be from the source node to the sink node or from the sink node to the source node. An upstream direction and a downstream direction are relative, either direction may be the upstream direction, and the other direction is the downstream direction. The embodiments of the present disclosure provide description by using an example in which the node A is a source node of S1 and P1 and a node B is a sink node on S1 and P1. On S1 or P1, a direction from the node A to the node B is the downstream direction, and a direction from the node B to the node A is the upstream direction.

Specifically, after determining that a resource between A and E is available, the source node A on P1 completes bridging with the downstream node E, and sends a signal fail message SF (W1, W1) to the downstream node E. Resource availability includes the resource between A and E is idle, or the resource between A and E is occupied by a low-priority service. The signal fail message may be represented by using an APS overhead, and an APS overhead encoding format is SF (W1, W1), where SF (W1, W1) indicates a signal failure, to request to activate the protection trail, and indicates that a node that sends the message has completed bridging.

After receiving the signal fail message SF (W1, W1), the node E determines that a resource between E and F is available, and the node E completes bridging and sends the same signal fail message SF (W1, W1) to a downstream node F. Processing procedures of the node F and a node G are similar to that of the node E, and details are not described herein.

The sink node B on P1 does not establish a selector and a bridge until the sink node B on P1 receives the signal fail message SF (W1, W1) and then determines that a protection resource between G and B is available. Then, the node B sends a reverse request message RR (W1, W1) to the upstream node G, to instruct the node G to establish a selector. The reverse request message may be represented by using an APS overhead whose encoding format is RR (W1, W1), indicating a reverse request, to request to activate the protection trail, and indicating that a node that sends the reverse request message has completed bridging.

After receiving the reverse request message RR (W1, W1), and determining that a resource between G and F is available, the node G establishes a selector, and sends the same reverse request message RR (W1, W1) to the upstream node F. Processing procedures of the node F and the node E are similar to that of the node G, and details are not described.

Protection switching of W1 is not completed until the source node A receives the reverse request message RR (W1, W1) and then establishes a selector. That is, W1 is switched from the working trail S1 to the protection trail P1.

Figure 5A:
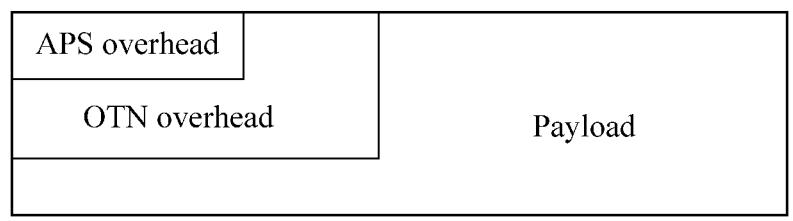
FIG. 5a is a schematic diagram of an APS message format according to an embodiment of the present disclosure.
Figure 5B:
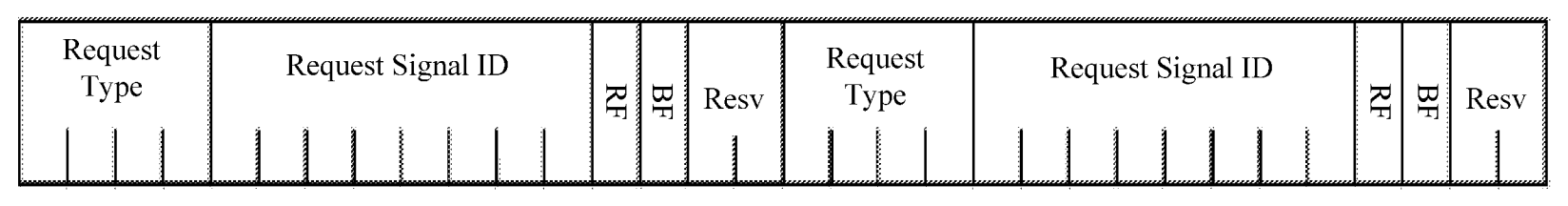

If the APS overhead encoding format in the prior art is used, overhead resource waste is caused because a reserved field is not fully used. Therefore, an embodiment of the present disclosure proposes an APS overhead encoding format, so that an overhead resource can be fully used. As shown in FIG. 5a, an APS message includes an APS overhead and a payload. The APS overhead is a part of an OTN overhead, and is used to carry protection switching status information, such as a protection switching request type and a service ID, and the payload part is used to carry service information. In this embodiment of the present disclosure, the APS overhead part is mainly defined. FIG. 5b is a schematic diagram of an APS overhead encoding format according to an embodiment of the present disclosure. As shown in FIG. 5b, four types of information are described in the encoding format below.

A (1) Request Type is included in the $1^{st}$ bit to the $4^{th}$ bit, and represents a protection switching request type such as SF, SD, RR, NR, MS, or FS. For example, SF is used in a scenario in which a fault occurs on a working trail and a service is switched from the working trail to a protection trail, SD is used in a scenario in which a signal on a working trail is degraded and a service is switched from the working trail to a protection trail, RR is used as a message in response to SF, SD, or the like, NR is used in a scenario in which a fault is removed from a working trail and a service is switched from a protection trail to the working trail, MS and FS are respectively used in a manual switching scenario and a forced switching scenario.

(2) Request Signal ID is included in the $5^{th}$ bit to the $12^{th}$ bit, and represents a service ID, for example, W1, of a service that requests a protection trail resource when a fault occurs on a working trail. When the service corresponding to the service ID is in a normal state and does not request the protection trail resource, Request Signal ID may be set to all zeros. The working trail and the protection trail may be corresponding to a same service ID. For example, a service ID of a service corresponding to S1 and P1 is W1, and a service ID of a service corresponding to S2 and P2 is W2.

A (3) Request Flag (RF) is included in the $13^{th}$ bit, and represents whether a service whose service ID is Request Signal ID has been requested. When a fault occurs on a working trail, a protection trail resource corresponding to the service whose service ID is Request Signal ID is requested, and RF may be set to 1, or when no fault occurs on a working trail, a protection trail resource corresponding to the service whose service ID is Request Signal ID is not requested, and RF may be set to 0. When Request Signal ID is set to all zeros, the RF flag bit has no meaning.

A (4) Bridge Flag (BF) is included in the $14^{th}$ bit, and represents whether a bridge is established on a node corresponding to a protection trail for a service whose service ID is Request Signal ID. If a bridge has been established on the node corresponding to the protection trail for the service whose service ID is Request Signal ID, BF is set to 1, or if no bridge is established on the node corresponding to the protection trail for the service whose service ID is Request Signal ID, BF is set to 0. When Request Signal ID is set to all zeros, the BF flag bit has no meaning.

Optionally, bit locations of the foregoing four types of information in the APS overhead encoding are not limited to the foregoing implementation. For example, locations of RF and BF are interchangeable.

Optionally, because Request Flag may be further uniquely identified by using Request Type, Request Flag may not be included in the foregoing encoding format. As shown in FIG. 5c, the RF flag bit is omitted, BF may be moved forward by one bit, and one bit is added to a reserved field. For example, a protection switching request type such as SF, SD, RR, MS, or FS is used to indicate that Request Flag is 1, and a protection switching request type such as NR is used to indicate that Request Flag is 0.

Figure 5D:
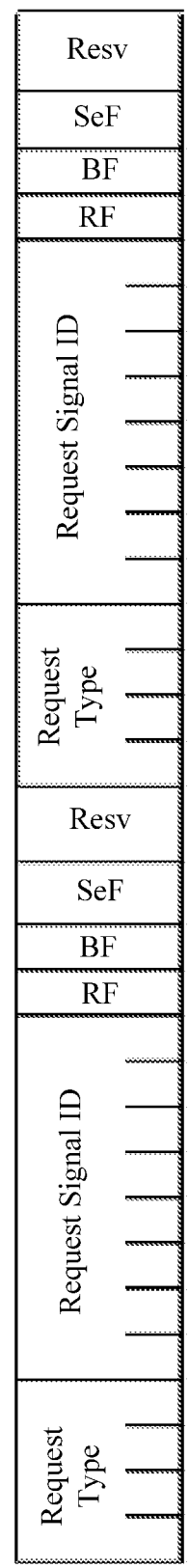
FIG. 5d is a schematic diagram of an APS overhead encoding format according to an embodiment of the present disclosure.

Optionally, as shown in FIG. 5d, the foregoing encoding format may further include a selector flag (SeF) bit. Specifically, the selector flag bit may be represented by using one bit in the reserved field, and represents whether a service whose service ID is Request Signal ID has been selected. If a selector has been established on a node corresponding to a protection trail for the service whose service ID is Request Signal ID, SeF is set to 1, or if no selector is established on a node corresponding to a protection trail for the service whose service ID is Request Signal ID, SeF is set to 0. When Request Signal ID is set to all zeros, the selector flag bit has no meaning.

Optionally, a length of the service ID of the service that requests the protection trail resource is not limited to 8 bits, and may be increased to 9 bits or 10 bits. If a bit increase is required, RF and BF are moved backward to a next bit, to occupy a bit in the Resv reserved field. For example, if Request Signal ID needs to be represented by 9 bits, the $1^{st}$ bit to the $4^{th}$ bit are Request Type, the $5^{th}$ bit to the $13^{th}$ bit are Request Signal ID, the $14^{th}$ bit is RF, the $15^{th}$ bit is BF, and the $16^{th}$ bit is Resv. If Request Signal ID needs to be represented by 10 bits, the $1^{st}$ bit to the $4^{th}$ bit are Request Type, the $5^{th}$ bit to the $14^{th}$ bit are Request Signal ID, the $15^{th}$ bit is RF, and the $16^{th}$ bit is BF. If the foregoing encoding format further includes Selector Flag, only one bit in the reserved field is available, and in this case, the service ID may be increased to 9 bits.

In the encoding format proposed in this embodiment of the present disclosure, the $17^{th}$ bit to the $32^{nd}$ bit and the $1^{st}$ bit to the $16^{th}$ bit have same meaning, but are corresponding to different timeslots. For example, an ODU1 link includes two timeslots. The foregoing 4-byte encoding format is considered as one frame. In one frame, the $1^{st}$ bit to the $16^{th}$ bit represent a timeslot 1, and the $17^{th}$ bit to the $32^{nd}$ bit represent a timeslot 2. For a link granularity that occupies more than two timeslots, such as ODU2, ODU3, or ODU4, an APS message needs to be represented by 4 frames, 16 frames, or 40 frames. In this embodiment of the present disclosure, because one frame indicates overhead information of two timeslots, a frame quantity is reduced by half compared with the prior art. That is, an overhead resource is saved by 50%, so that an APS overhead field is fully used.

Figure 6A:
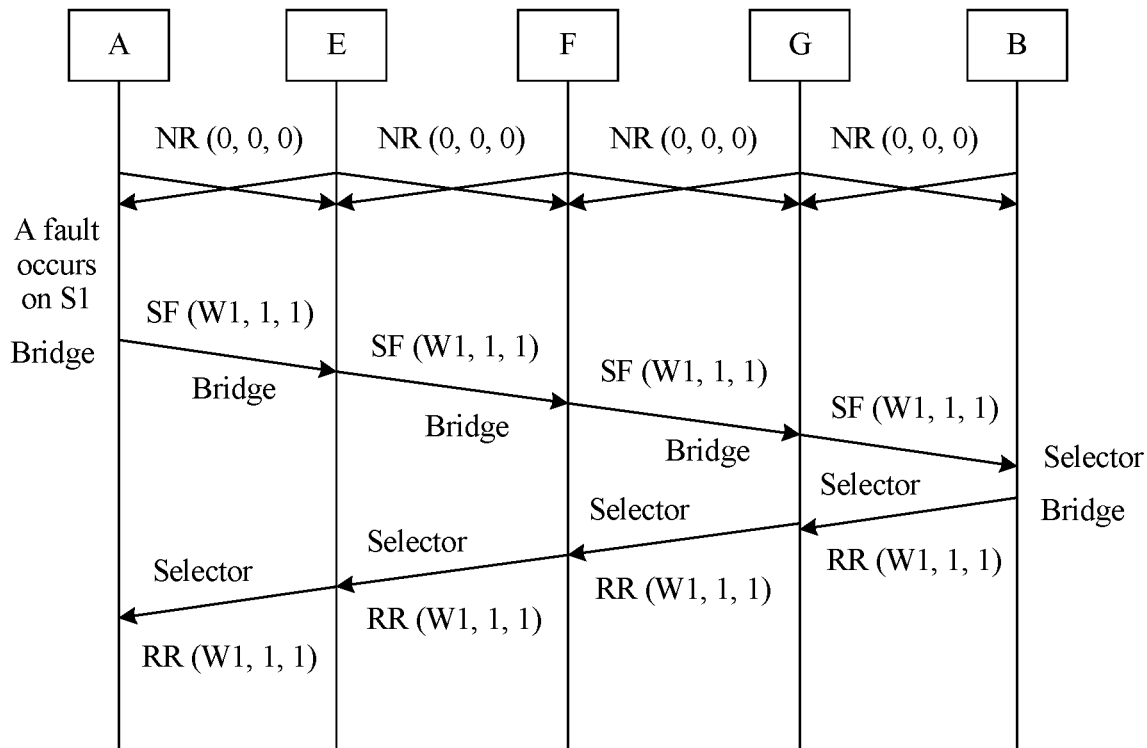
FIG. 6a is a signaling flowchart of protection switching implemented by using an APS overhead encoding format according to an embodiment of the present disclosure.
Figure 6B:
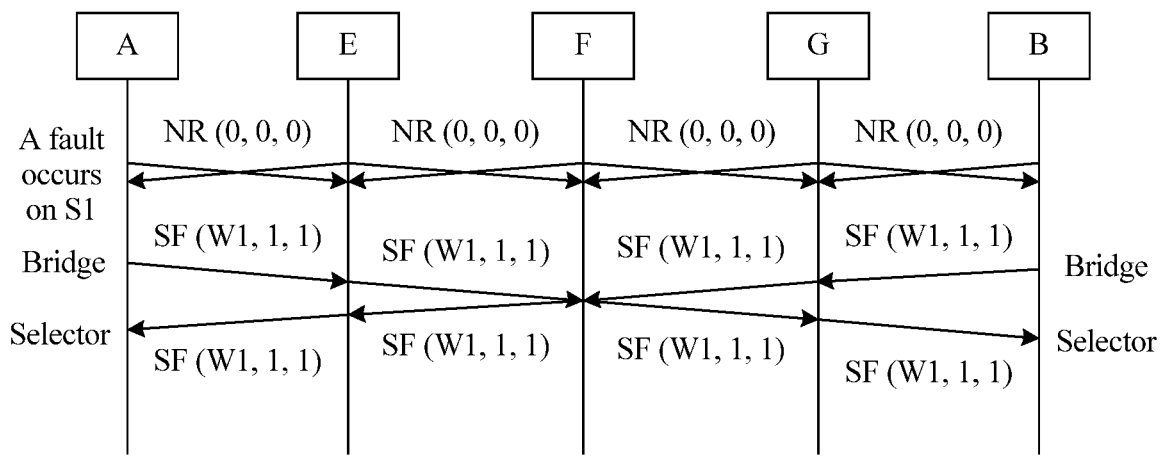
FIG. 6b is a signaling flowchart of protection switching implemented by using an APS overhead encoding format according to an embodiment of the present disclosure.

FIG. 6a and FIG. 6b are signaling flowcharts of protection switching implemented by using an APS overhead encoding format according to an embodiment of the present disclosure. As shown in FIG. 6a and FIG. 6b, in the network topology structure shown in FIG. 2, when it is detected that a fault occurs on S1, the protection trail P1, A-E-F-G-B, of S1 needs to be activated. In a signaling procedure, there are two APS messages: SF (W1, 1, 1) and RR (W1, 1, 1). SF (W1, 1, 1) indicates a signal failure, and indicates that a status of a protection resource corresponding to W1 is updated to the protection resource has been requested by W1 and has been bridged. RR (W1, 1, 1) indicates a reverse request, and indicates that the status of the protection resource corresponding to W1 is updated to the protection resource has been requested by W1 and has been bridged.

The following describes, with reference to several examples, the APS overhead encoding format proposed in this embodiment of the present disclosure.

FIG. 7a and FIG. 7b are schematic diagrams of an APS overhead encoding format according to an embodiment of the present disclosure. Specifically, description is given by using a signal fail message SF (W1, 1, 1) as an example. For example, when an ODU2 link is used to protect a service in an ODU0 link, and a fault occurs in the ODU0 link, one timeslot of protection resource of the ODU2 link needs to be occupied. The overhead encoding format in FIG. 7a indicates that a first timeslot of the ODU2 link is requested by W1 and has been bridged, and the overhead encoding format in FIG. 7b indicates that a second timeslot of the ODU2 link is requested by W1 and has been bridged. The first timeslot and the second timeslot may be any one of timeslots of the ODU2 link, and may be configured on a node before a fault occurs on a working trail.

FIG. 8 is a schematic diagram of another APS overhead encoding format according to an embodiment of the present disclosure. Specifically, description is given by using a signal fail message SF (W1, 1, 1; W1, 1, 1) as an example. For example, when an ODU2 link is used to protect a service in an ODU1 link, and a fault occurs in the ODU1 link, two timeslots of protection resources of the ODU2 link need to be occupied. The overhead encoding format in FIG. 8 indicates that a first timeslot and a second timeslot of the ODU2 link are requested by W1 and have been bridged. The first timeslot and the second timeslot may be any one of timeslots of the ODU2 link, and may be configured on a node before a fault occurs on a working trail.

FIG. 9 is a schematic diagram of another APS overhead encoding format according to an embodiment of the present disclosure. Specifically, description is given by using a signal fail message SF (W1, 1, 1; W2, 1, 1) as an example. For example, an ODU2 link is used to protect services in two ODU0 links, and when a fault occurs on both of the two ODU0 links, two timeslots of protection resources of the ODU2 link need to be occupied, and each ODU0 link occupies one timeslot. The overhead encoding format in FIG. 9 indicates that a first timeslot of the ODU2 link is requested by W1 and has been bridged and that a second timeslot of the ODU2 link is requested by W2 and has been bridged.

The following specifically describes a step performed by each node in the signaling procedures shown in FIG. 6a and FIG. 6b. A difference between FIG. 6a and FIG. 6b is as follows. FIG. 6a shows that a node A initiates a protection switching signaling procedure, and FIG. 6b shows that a node A and a node B simultaneously initiate a protection switching signaling procedure. The following provides description by using FIG. 6a as an example.

Node A: When detecting that a fault occurs on a working trail, the node A sends a signal fail message to a downstream node E. In addition, the node A receives a reverse request message from the downstream node E.

Specifically, that the node A detects that a fault occurs on the working trail S1 may be as follows. The node A detects a link fault, or the node B detects a link fault and then notifies the node A of the link fault. When detecting that a fault occurs on the working trail, the node A may establish a bridge, for example, the bridge 3 shown in FIG. 4, between A and E after the node A determines that a resource between the node A and the downstream node E is available. Resource availability herein means that the resource is idle, that is, the resource is not occupied by another service. Certainly, resource availability may further include the resource is occupied by a low-priority service. After establishing the bridge between A and E, the node A may send the signal fail message SF (W1, 1, 1) to the downstream node E.

Specifically, a time at which the node A receives the reverse request message RR (W1, 1, 1) from the node E depends on a time at which the node E sends the message to the node A. For details, refer to a step performed by the node E. After receiving the RR (W1, 1, 1) message sent by the node E, the node A determines that the resource between the node A and the node E is available, and establishes a selector between E and A, for example, the selector 4 shown in FIG. 4.

The signal fail message sent by the node A to the downstream node E may be represented by using an APS overhead whose encoding format is SF (W1, 1, 1), indicating a signal failure and indicating that a protection trail P1 has been requested by W1 and a bridge has been established. The reverse request message received by the node A from the downstream node E may be represented by using an APS overhead whose encoding format is RR (W1, 1, 1), indicating a reverse request, to request to activate the protection trail P1 of W1, and indicating that a node that sends the message has established a bridge. Specifically, for the overhead encoding format of the signal fail message SF (W1, 1, 1) and the overhead encoding format of the reverse request message RR (W1, 1, 1), refer to the embodiments shown in FIG. 5b to FIG. 5d, FIG. 7a, FIG. 7b, FIG. 8, and FIG. 9. The present disclosure sets no limitation on a quantity of services that request a protection trail resource, a quantity of occupied timeslots of protection resources, and the like in overhead encoding.

Node E: After receiving the signal fail message from the node A, the node E sends the signal fail message to a downstream node F, and sends the reverse request message to the upstream node A. In addition, the node E receives a reverse request message from the downstream node F.

Specifically, after receiving the signal fail message SF (W1, 1, 1), the node E may establish a bridge, for example, the bridge 1 of the node E shown in FIG. 4, between E and F after the node E determines that a resource between the node E and the downstream node F is available. In addition, the node E may establish a selector, for example, the selector 1 of the node E shown in FIG. 4, between A and E after determining that a resource between the node E and the upstream node A is available. Optionally, the node E may establish the selector between A and E after receiving the RR (W1, 1, 1) message from the node F.

The node E may first send the signal fail message SF (W1, 1, 1) to the downstream node F, and then send the reverse request message RR (W1, 1, 1) to the upstream node A. Alternatively, the node E may first send the RR (W1, 1, 1) message to the upstream node A, and then send the SF (W1, 1, 1) message to the downstream node F.

Specifically, the node E may send the RR (W1, 1, 1) message to the node A immediately after receiving the SF (W1, 1, 1) message from the node A. Optionally, the node E may send the RR (W1, 1, 1) message to the node A after receiving the RR (W1, 1, 1) message sent by the node F.

A time at which the node E receives the reverse request message RR (W1, 1, 1) from the node F depends on a time at which the node F sends the message to the node E. For details, refer to a process in which the node A receives the RR (W1, 1, 1) message from the node E. After receiving the RR (W1, 1, 1) message from the node F, the node E establishes a bridge, for example, the bridge 2 of the node E shown in FIG. 4, between E and A after determining that the resource between the node E and the upstream node A is available. In addition, the node E may establish a selector, for example, the selector 2 shown in FIG. 4, between F and E after determining that the resource between the node E and the downstream node F is available.

Node F: After receiving the signal fail message from the upstream node E, the node F sends the signal fail message to a downstream node G, and sends the reverse request message to the upstream node E. In addition, the node F receives a reverse request message from the downstream node G.

A processing procedure of the node F is similar to that of the node E, and details are not described.

Node G: After receiving the signal fail message from the upstream node F, the node G sends the signal fail message to the downstream node B, and sends the reverse request message to the upstream node F. In addition, the node G receives a reverse request message from the downstream node B.

A processing procedure of the node G is similar to that of the node E, and details are not described.

Node B: After receiving the signal fail message from the upstream node G, the node B sends the reverse request message to the upstream node G.

Specifically, after receiving the signal fail message SF (W1, 1, 1) from the upstream node G, the node B determines that a resource between the node B and the node G is available, establishes a selector between G and B and a bridge between B and G, and sends the reverse request message to the upstream node G. Specifically, the node B may first establish the selector between G and B and then establish the bridge between B and G, or may first establish the bridge between B and G and then establish the selector between G and B, or may simultaneously establish the selector between G and B and the bridge between B and G.

In this embodiment of the present disclosure, alternatively, the node B may send a signal fail message to the node A, the node A may send a reverse request message to the node B, and a signaling procedure is similar thereto. Alternatively, as shown in FIG. 6*b*, the node A and the node B simultaneously send a signal fail message to a peer node. Specifically, the node A sends an SF (W1, 1, 1) message to the node B, and at the same time, the node B sends an SF (W1, 1, 1) message to the node A. Processing steps of receiving the SF (W1, 1, 1) message by the nodes are similar. Because the SF (W1, 1, 1) message is sent bidirectionally, after receiving the SF (W1, 1, 1) message, each node does not need to send an RR (W1, 1, 1) message. Optionally, the node A and the node B each may initiate a protection switching signaling procedure at different moments, and the present disclosure sets no limitation on a sequence of the signaling procedures.

In the APS overhead encoding format proposed in this embodiment of the present disclosure, because an APS message of one frame can indicate overheads of two timeslots, overhead resource utilization is improved, so that protection switching efficiency is improved when a fault occurs on the working trail.

Figure 10A:
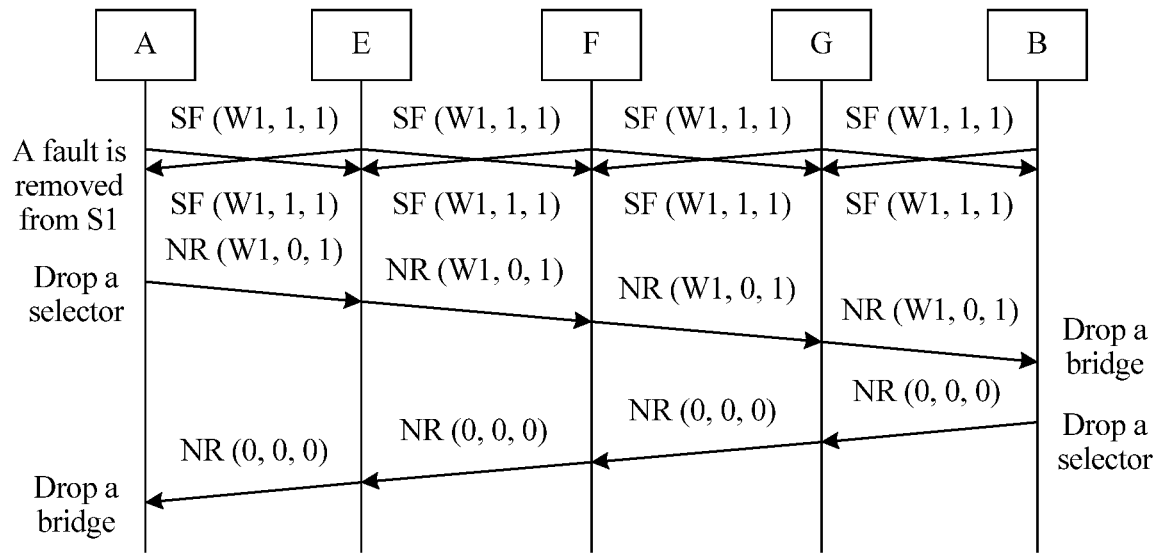
FIG. 10a is a signaling flowchart of fault removal implemented by using an APS overhead encoding format according to an embodiment of the present disclosure.
Figure 10B:
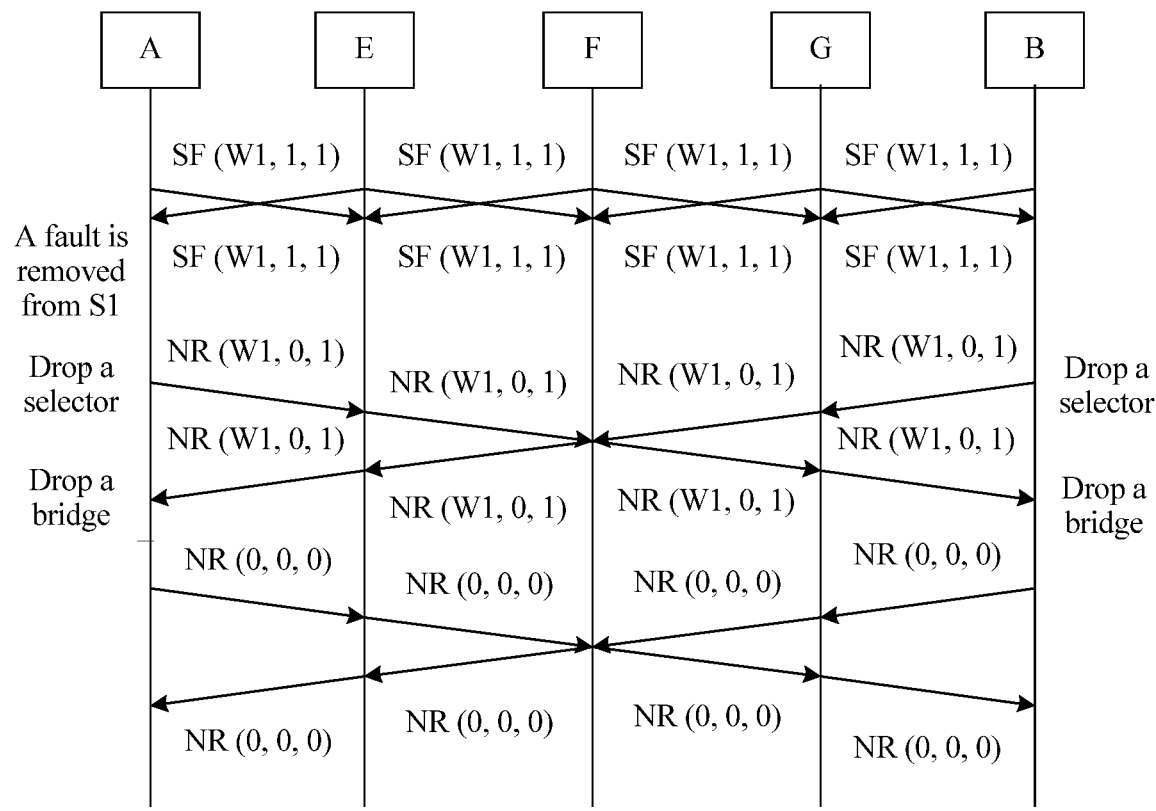
FIG. 10b is a signaling flowchart of fault removal implemented by using an APS overhead encoding format according to an embodiment of the present disclosure.

FIG. 10*a* and FIG. 10*b* are signaling flowcharts of fault removal implemented by using an APS overhead encoding format according to an embodiment of the present disclosure. After the signaling procedures shown in FIG. 6*a* and FIG. 6*b*, that is, after the service W1 is switched from the working trail S1 to the protection trail P1, a fault is removed from the working trail S1, and the service is reverted from the protection trail P1 to the working trail S1. As shown in FIG. 10*a* and FIG. 10*b*, two APS messages are used in the signaling procedure: NR (W1, 0, 1) and NR (0, 0, 0). NR (W1, 0, 1) indicates that there is no request, and indicates that a status of a protection resource corresponding to W1 is updated to the protection resource is not requested and has been bridged. NR (0, 0, 0) indicates that there is no request, and indicates that the status of the protection resource is updated to the protection resource is not bridged to a service.

The following specifically describes a step performed by each node in the signaling procedures shown in FIG. 10*a* and FIG. 10*b*. A difference between FIG. 10*a* and FIG. 10*b* is as follows. FIG. 10*a* shows that a node A initiates a protection reversion signaling procedure, and FIG. 10*b* shows that a node A and a node B simultaneously initiate a protection reversion signaling procedure. The following provides description by using FIG. 10*a* as an example.

Node A: When detecting that a fault is removed from a working trail, the node A sends a first no-request message to a downstream node E, and receives a second no-request message from the downstream node E.

Generally, fault removal may be successively detected by a source node and a sink node, or may be detected by either of a source node and a sink node, or may be simultaneously detected by a source node and a sink node. After detecting that the fault is removed from the working trail S1, when sending the first no-request message NR (W1, 0, 1) to the node E, the node A may release a selector between E and A. Optionally, the node A may release the selector between E and A before sending the NR (W1, 0, 1) message or after sending the NR (W1, 0, 1) message.

Specifically, a time at which the node A receives the second no-request message NR (0, 0, 0) from the node E depends on a time at which the node E sends the message to the node A. For details, refer to a step performed by the node E. The node A releases a bridge between A and E after receiving the NR (0, 0, 0) message from the node E.

The first no-request message sent by the node A to the downstream node E may be represented by using an APS overhead whose encoding format is NR (W1, 0, 1), indicating that a protection resource corresponding to W1 is not requested but a bridge has been established. The second no-request message received by the node A from the downstream node E may be represented by using an APS overhead whose encoding format is NR (0, 0, 0), indicating that the protection resource is not requested and a bridge has not been established. FIG. 11 is a schematic diagram of an overhead encoding format of an NR (W1, 0, 1) message according to an embodiment of the present disclosure. For example, when an ODU2 link is used to protect a service in an ODU1 link, and a fault occurs in the ODU1 link, two timeslots of protection resources of the ODU2 link need to be occupied. The overhead encoding format in FIG. 11 indicates that a first timeslot and a second timeslot of the ODU2 link are not requested but a bridge has been established. For the overhead encoding format of NR (0, 0, 0), refer to FIG. 11, and Request Signal ID and Bridge Flag in the NR (W1, 0, 1) are both set to 0. For the overhead encoding format of the first no-request message NR (W1, 0, 1) and the overhead encoding format of the second no-request message NR (0, 0, 0), further refer to the embodiments shown in FIG. 5b to FIG. 5d, FIG. 7a, FIG. 7b, FIG. 8, and FIG. 9. The present disclosure sets no limitation on a quantity of services that request a protection trail resource, a quantity of occupied timeslots of protection resources, and the like in overhead encoding.

Node E: The node E receives the first no-request message from the upstream node A, sends the first no-request message to a downstream node F, and sends the second no-request message to the upstream node A. In addition, the node E receives a second no-request message from the downstream node F.

Specifically, after receiving the first no-request message NR (W1, 0, 1) from the upstream node A and sending the first no-request message, the node E releases a selector between F and E, for example, the selector 2 of the node E shown in FIG. 4, and releases a bridge between E and A, for example, the bridge 2 of the node E shown in FIG. 4.

The node E may first send the first no-request message NR (W1, 0, 1) to the downstream node F, and then send the second no-request message NR (0, 0, 0) to the upstream node A. Alternatively, the node E may first send the NR (0, 0, 0) message to the upstream node A, and then send the NR (W1, 0, 1) to the downstream node F.

Specifically, the node E may send the NR (0, 0, 0) message to the node A immediately after receiving the NR (W1, 0, 1) message from the node A. Optionally, the node E may send the NR (0, 0, 0) message to the node A after receiving the NR (0, 0, 0) message from the node F.

A time at which the node E receives the second no-request message NR (0, 0, 0) from the node F depends on a time at which the node F sends the message to the node E. For details, refer to a process in which the node A receives the NR (0, 0, 0) message from the node E. After receiving the NR (0, 0, 0) message from the node F, the node E releases a bridge between E and F, for example, the bridge 1 shown in FIG. 4, and releases a selector between A and E, for example, the selector 1 shown in FIG. 4.

Node F: After receiving the first no-request message from the upstream node E, the node F sends the first no-request message to a downstream node G, and sends the second no-request message to the upstream node E. In addition, the node F receives a second no-request message from the downstream node G.

A processing procedure of the node F is similar to that of the node E, and details are not described.

Node G: After receiving the first no-request message from the upstream node F, the node G sends the first no-request message to the downstream node B, and sends the second no-request message to the upstream node F. In addition, the node G receives a second no-request message from the downstream node B.

A processing procedure of the node G is similar to that of the node F, and details are not described.

Node B: After receiving the first no-request message from the upstream node G, the node B sends the second no-request message to the upstream node G.

Specifically, after receiving the first no-request message NR (W1, 0, 1) from the upstream node G, the node B releases a bridge between B and G and a selector between G and B, and sends the second no-request message NR (0, 0, 0) to the upstream node G. Specifically, the node B may first release the selector between G and B and then release the bridge between B and G, or may first release the bridge between B and G and then release the selector between G and B, or may simultaneously release the selector between G and B and the bridge between B and G.

In this embodiment of the present disclosure, alternatively, the node B may send a first no-request message to the node A, the node A sends a second no-request message to the node B, and a signaling procedure is similar thereto. Alternatively, as shown in FIG. 10b, the node A and the node B simultaneously send a first no-request message to a peer node. Specifically, the node A sends an NR (W1, 0, 1) message to the node B, and after receiving the message, the node B sends an NR (0, 0, 0) message to the node A, and at the same time, the node B sends an NR (W1, 0, 1) message to the node A, and after receiving the message, the node A sends an NR (0, 0, 0) message to the node B. Processing steps of receiving the NR (W1, 0, 1) message by the nodes are similar. Because the NR (W1, 0, 1) message is sent bidirectionally, after receiving the NR (0, 0, 0) message, each node does not release the bridge or the selector. Optionally, the node A and the node B each may initiate a protection switching signaling procedure at different moments, and the present disclosure sets no limitation on a sequence of the signaling procedures.

In the APS overhead encoding format proposed in this embodiment of the present disclosure, because an APS message of one frame can indicate overheads of two timeslots, overhead resource utilization is improved, so that service recovery efficiency is improved when the fault is removed from the working trail.

Figure 12A:
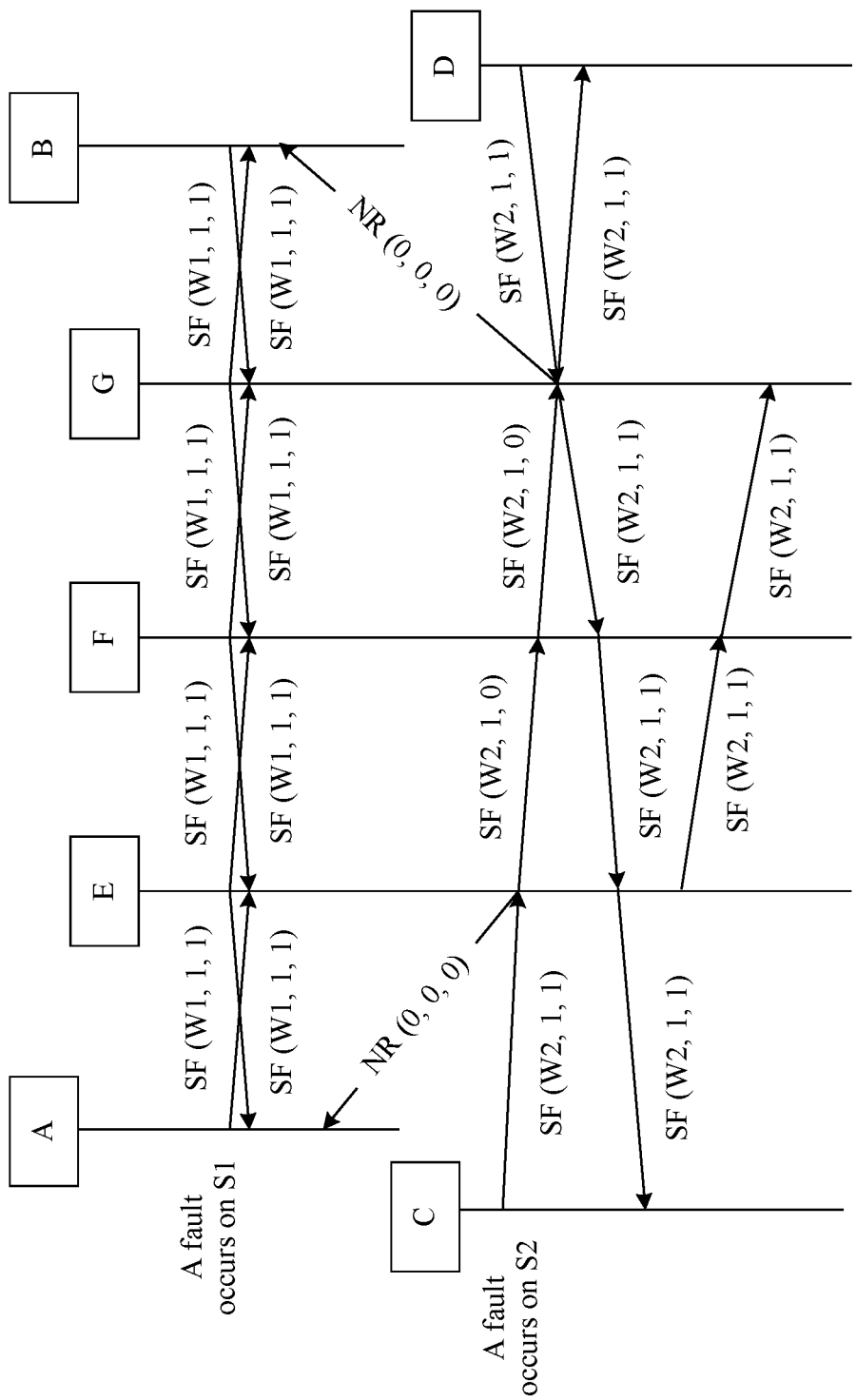
FIG. 12a is a signaling flowchart of protection switching implemented by using an APS overhead encoding format according to an embodiment of the present disclosure.
Figure 12B:
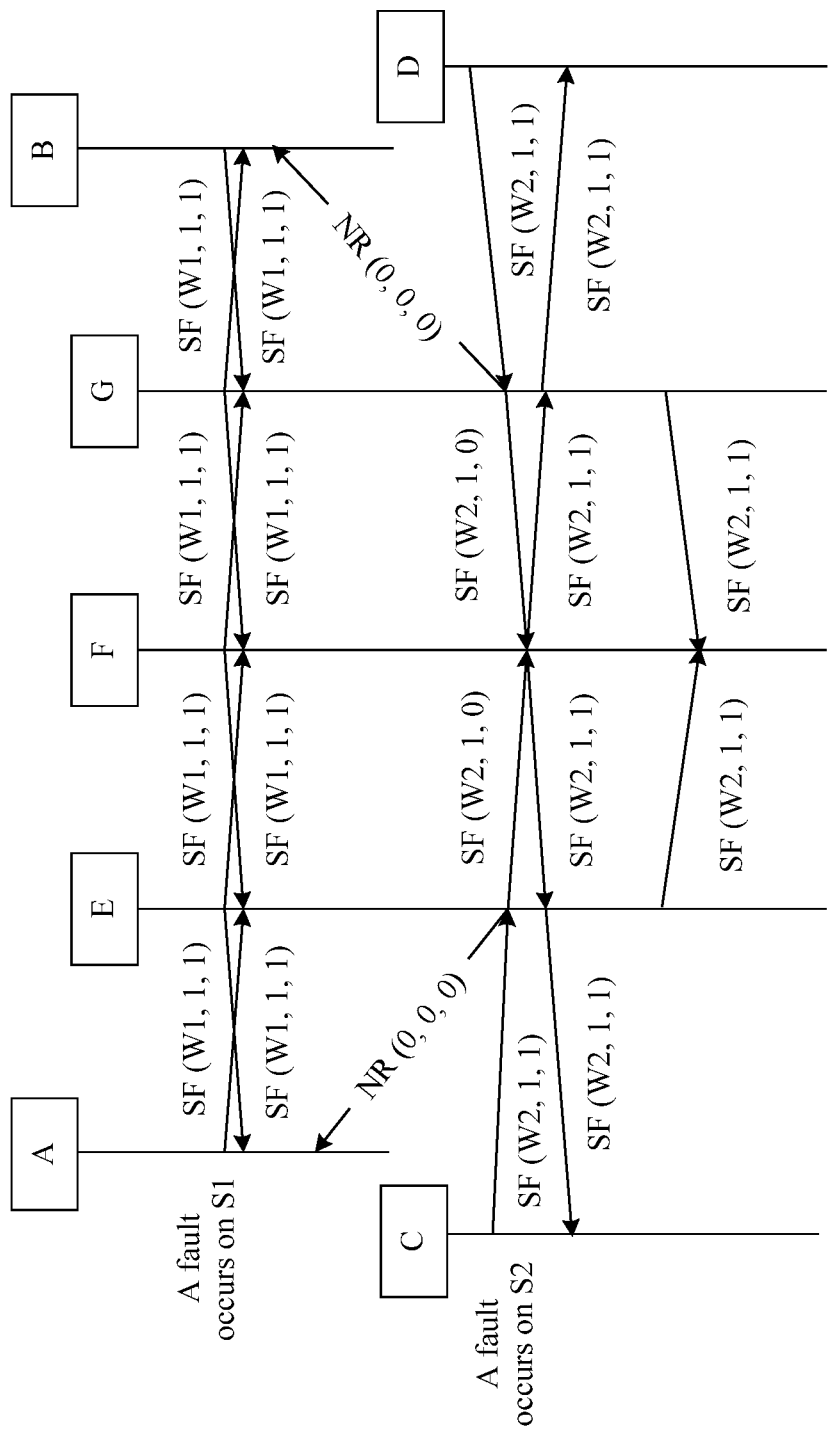
FIG. 12b is a signaling flowchart of protection switching implemented by using an APS overhead encoding format according to an embodiment of the present disclosure.

FIG. 12a and FIG. 12b are signaling flowcharts of protection switching implemented by using an APS overhead encoding format according to an embodiment of the present disclosure. In the network topology structure shown in FIG. 2, a trail of a protection resource shared by a protection trail P1 of a working trail S1 and a protection trail P2 of a working trail S2 is E-F-G, and a priority for a service W2 to occupy the shared protection resource is higher than that for a service W1 to occupy the shared protection resource. After the signaling procedures shown in FIG. 6a and FIG. 6b, that is, after W1 is switched from S1 to P1, when it is detected that a fault occurs on S2, the protection trail P2, C-E-F-G-D, of S2 needs to be activated. Because the priority of W2 is higher than the priority of W1, W2 may preempt the shared protection resource E-F-G. In this embodiment, reverting the service W1 from the protection trail P1 to the working trail S1 is performed in the signaling procedure, and this process is similar to the signaling procedures, in FIG. 10a and FIG. 10b, in which a fault is removed from the working trail S1 and the service W1 is reverted from the protection trail P1 to the working trail. As shown in FIG. 12a and FIG. 12b, an APS message SF (W2, 1, 0) is used in the signaling procedure in which W2 preempts the shared protection resource, indicating a signal failure, and indicating that a status of a protection resource corresponding to W2 is updated to the protection resource is requested by W2 but is not bridged.

The following specifically describes a step performed by each node in the signaling procedures shown in FIG. 12a and FIG. 12b. A difference between FIG. 12a and FIG. 12b is as follows. FIG. 12a shows that a node C initiates a protection switching signaling procedure earlier than a node D, and FIG. 12b shows that a node C and a node D simultaneously initiate a protection switching signaling procedure. The following provides description by using FIG. 12a as an example.

Node C: When detecting that a fault occurs on a working trail, the node C sends a first signal fail message to a downstream node E, and receives a first signal fail message from the downstream node E.

This embodiment of the present disclosure provides description by using an example in which the node C is a source node of S2 and P2 and the node D is a sink node of S2 and P2. On S2 or P2, a direction from the node C to the node D is a downstream direction, and a direction from the node D to the node C is an upstream direction.

Specifically, that the node C detects that a fault occurs on the working trail S2 may be as follows. The node C detects a link fault, or the node D detects a link fault and then notifies the node C of the link fault. When detecting that a fault occurs on the working trail, the node C may establish a bridge between C and E after the node C determines that a resource between the node C and the node E is available. Resource availability herein means that the resource is idle, that is, the resource is not occupied by another service. After establishing the bridge between C and E, the node C may send the first signal fail message SF (W2, 1, 1) to the downstream node E.

A time at which the node C receives the first signal fail message SF (W2, 1, 1) from the downstream node E depends on a time at which the node D initiates a protection switching signaling procedure to the node C. For details, refer to steps performed by the node D and the node E. After receiving the SF (W2, 1, 1) message sent by the node E, the node C determines that the resource between the node C and the node E is available, and establishes a selector between E and C.

The first signal fail message may be transferred by using an APS message, and an encoding format is SF (W2, 1, 1), indicating a signal failure and indicating that a protection trail P2 has been requested by W2 and has been bridged. Specifically, for the overhead encoding format of the signal fail message SF (W2, 1, 1), refer to the embodiments shown in FIG. 5b to FIG. 5d, FIG. 7a, FIG. 7b, FIG. 8, and FIG. 9. The present disclosure sets no limitation on a quantity of services that request a protection trail resource, a quantity of occupied timeslots of protection resources, and the like in overhead encoding.

Node E: After receiving the first signal fail message from the upstream node C, the node E sends a second signal fail message to a downstream node F, receives a first signal fail message from the downstream node F, and sends the first signal fail message to the upstream node C.

Specifically, after receiving the first signal fail message SF (W2, 1, 1) from the upstream node C, the node E detects that a resource between E and F is occupied by W1, does not establish a bridge between E and F, and sends a second signal fail message SF (W2, 1, 0) to the downstream node F. After receiving the SF (W2, 1, 1) message from the node C, the node E determines that a resource between the node E and the upstream node C is available, and may establish a selector between C and E. Optionally, the node E may establish the selector between C and E after receiving the first signal fail message SF (W2, 1, 1) from the downstream node F. The node E may compare priorities of W1 and W2, and after determining that the priority of W2 is higher than the priority of W1, instruct the node E to revert the service W1 from P1 to the working trail S1 on the upstream node A of P1. Optionally, the node E may instruct, by using the node F and the node G, the node B to revert the service W1 to the working trail S1. A reversion process of the service W1 is similar to the signaling procedures in FIG. 10a and FIG. 10b, and details are not described herein.

A time at which the node E receives the first signal fail message SF (W2, 1, 1) sent by the downstream node F depends on the time at which the node D initiates the protection switching signaling procedure to the node C.

After receiving the SF (W2, 1, 1) message from the node F, and determining that the resource between the node E and the node F is available, the node E establishes a selector between F and E. In addition, after determining that the resource between the node E and the node C is available, the node E establishes a bridge between E and C. After establishing the bridge between E and C, the node E sends the SF (W2, 1, 1) message to the upstream node C.

After receiving the SF (W2, 1, 1) message from the downstream node F, the node E determines that the resource between the node E and the node F is available, and establishes a bridge between E and F. Optionally, if the node E has not established the selector between C and E, the node E may further establish the selector between C and E at this time. Further, the node E sends an SF (W2, 1, 1) message to the downstream node F. Specifically, the node E may first send the SF (W2, 1, 1) message to the upstream node C, and then send the SF (W2, 1, 1) message to the downstream node F. Alternatively, the node E may first send the SF (W2, 1, 1) message to the downstream node F, and then send the SF (W2, 1, 1) message to the upstream node C.

Specifically, the node E sends the second signal fail message SF (W2, 1, 0) to the downstream node F, indicating a signal failure and indicating that the protection trail P2 has been requested by W2 but a bridge has not been established. FIG. 13 is a schematic diagram of an overhead encoding format of an SF (W2, 1, 0) message according to an embodiment of the present disclosure. For example, when an ODU2 link is used to protect a service in an ODU0 link, and a fault occurs in the ODU0 link, one timeslot of protection resource of the ODU2 link needs to be occupied. The overhead encoding format shown in FIG. 13 indicates that a first timeslot of the ODU2 link is requested by W2 but is not bridged. For the overhead encoding format of the second signal fail message SF (W2, 1, 0), further refer to the embodiments shown in FIG. 5b to FIG. 5d, FIG. 7a, FIG. 7b, FIG. 8, and FIG. 9. The present disclosure sets no limitation on a quantity of services that request a protection trail resource, a quantity of occupied timeslots of protection resources, and the like in overhead encoding.

Node F: The node F receives the second signal fail message from the upstream node E, sends the second signal fail message to a downstream node G, receives a first signal fail message from the downstream node G, and sends the first signal fail message to the upstream node E.

A processing procedure of the node F is similar to that of the node E, and details are not described.

Node G: The node G receives the second signal fail message from the upstream node F, sends the first signal fail message to the downstream node D, receives a first signal fail message from the downstream node D, and sends the first signal fail message to the upstream node F.

After receiving the second signal fail message SF (W2, 1, 0) from the upstream node F, the node G detects that a resource between the node G and the downstream node D is available, establishes a bridge between G and D, and sends the first signal fail message SF (W2, 1, 1) to the downstream node D. After receiving the SF (W2, 1, 0) message from the node F, the node G instructs the node B to revert W1 from the protection trail P1 to the working trail S1. In this case, a resource between the node G and the node F is not occupied by another service, and the node G may establish a selector between F and G. Optionally, the node G may establish the selector between F and G after receiving the first signal fail message SF (W2, 1, 1) sent by the upstream node F.

After the node G receives the first signal fail message SF (W2, 1, 1) from the downstream node D, if the node G has received the second signal fail message SF (W2, 1, 0) from the upstream node F at this time, the node G may determine that the resource between the node G and the node F has been released by the service W1 and the resource between G and F is available. The node G may establish a bridge between G and F and establish a selector between D and G, and the node G sends the SF (W2, 1, 1) message to the upstream node F.

Optionally, the node G may first receive the SF (W2, 1, 1) message from the node D, and then receive the SF (W2, 1, 0) message from the node F. As shown in FIG. 12b, if the node G does not receive the SF (W2, 1, 0) message from the node F when the node G receives the SF (W2, 1, 1) message from the node D, the resource between G and F is likely occupied by the service W1 at this time. The node G may first establish the selector between D and G but not establish the bridge between G and F, and send the SF (W2, 1, 1) message to the upstream node F.

A time at which the node G receives the SF (W2, 1, 1) message from the node F depends on a time at which the node F sends the message. The node F may send the SF (W2, 1, 1) message to the node G immediately after receiving the SF (W2, 1, 1) message from the node G. Alternatively, the node F may send the SF (W2, 1, 1) message to the node G after receiving the SF (W2, 1, 1) message from the node E.

Node D: The node D receives the first signal fail message from the upstream node G, and sends the first signal fail message to the upstream node G.

The node D may further establish a selector between G and D and a bridge between G and D after detecting that a fault occurs on the working trail and determining that a resource between the node G and the node D is not occupied by another service and is in an available state. Further, the node D sends the first signal fail message SF (W2, 1, 1) to the upstream node G.

The node D may initiate the protection switching signaling procedure after detecting that a fault occurs on the working trail S2. Alternatively, the node D initiates the protection switching signaling procedure after receiving the SF (W2, 1, 1) message from the upstream node G. Specifically, the node D may send the first signal fail message SF (W2, 1, 1) to the upstream node G before receiving the first signal fail message SF (W2, 1, 1) from the upstream node G. Alternatively, the node D may send the SF (W2, 1, 1) message to the upstream node G after receiving the SF (W2, 1, 1) message from the upstream node G.

In this embodiment, the node C or the node D may individually initiate the protection switching signaling procedure. Alternatively, as shown in FIG. 12b, the node C and the node D simultaneously send a first signal fail message to a peer node. Specifically, when the node C and the node D simultaneously detect that a fault occurs on the working trail, the node C sends SF (W2, 1, 1) to the node E, and the node D sends SF (W2, 1, 1) to the node G, and the node E sends SF (W2, 1, 0) to the node F, and the node G sends SF (W2, 1, 0) to the node F. In this case, after receiving SF (W2, 1, 0) in two directions, the node F determines that the service W1 has been reverted, and the node F may establish a bridge and a selector for W2, and send SF (W2, 1, 1) to the node E and the node G. After receiving SF (W2, 1, 1), the node E sends SF (W2, 1, 1) to the node F, and sends SF (W2, 1, 1) to the node C. After receiving SF (W2, 1, 1), the node G sends SF (W2, 1, 1) to the node F, and sends SF (W2, 1, 1) to the node D. Each node may establish a bridge and a selector after receiving the SF (W2, 1, 1) message.

In the APS overhead encoding format proposed in this embodiment of the present disclosure, because an APS message of one frame can indicate overheads of two timeslots, an APS overhead field is fully used, so that protection switching efficiency is improved when a fault occurs on the working trail.

Figure 14:
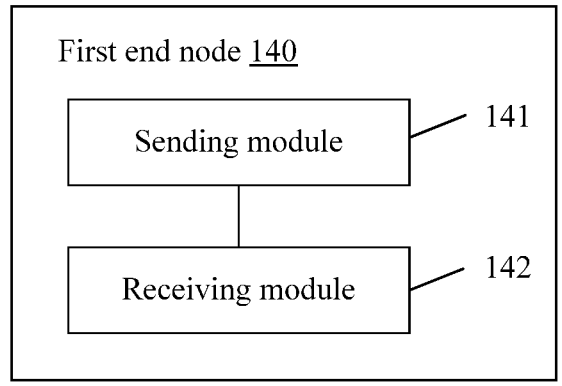
FIG. 14 is a schematic structural diagram of a network node according to an embodiment of the present disclosure.

FIG. 14 is a schematic structural diagram of a network node according to an embodiment of the present disclosure. As shown in FIG. 14, a first end node 140 includes a sending module 141 and a receiving module 142. The first end node 140 may be a common end node of a working trail and a protection trail.

Specifically, the sending module 141 is configured to, when a fault occurs on the working trail between the first end node and a second end node, send a first protection switching request message to an intermediate node, where the protection trail of the working trail includes the first end node, the second end node, and at least one intermediate node.

The receiving module 142 is configured to receive a second protection switching request message from the intermediate node, and switch service data to the protection trail for transmission.

One overhead frame of the first protection switching request message and the second protection switching request message includes at least two overhead information groups, and the overhead information group includes a request type field, a request signal identifier field, and a bridge flag field.

The request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

Optionally, the overhead information group further includes a request flag field, where the request flag field is used to indicate whether the service corresponding to the service identifier indicated by the request signal identifier field requests the protection resource.

Optionally, the overhead information group further includes a reserved field, where the request type field occupies 4 bits, the request signal identifier field occupies 8 bits, the request flag field occupies 1 bit, the bridge flag field occupies 1 bit, and the reserved field occupies 2 bits.

Optionally, the request type field occupies 4 bits, the request signal identifier field occupies 10 bits, the request flag field occupies 1 bit, and the bridge flag field occupies 1 bit.

Optionally, the overhead information group further includes a reserved field, where the request type field occupies 4 bits, the request signal identifier field occupies 9 bits, the request flag field occupies 1 bit, the bridge flag field occupies 1 bit, and the reserved field occupies 1 bit.

Optionally, the overhead information group may further include a selector flag field, where the selector flag bit field is used to indicate whether the protection resource corresponding to the service identifier indicated by the request signal identifier field has been selected.

Optionally, the first protection switching request message and the second protection switching request message are APS messages.

In this embodiment of the present disclosure, in a process in which a node performs protection switching, because one overhead frame of a protection switching request message may include information about two overhead groups, to indicate overheads of two timeslots, an overhead field is fully used, so that protection switching efficiency is improved.

Figure 15:
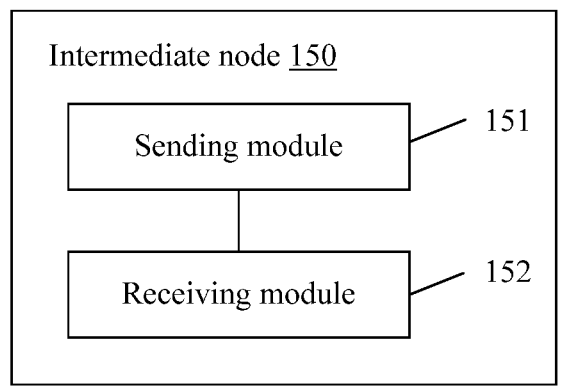
FIG. 15 is a schematic structural diagram of a network node according to an embodiment of the present disclosure.

FIG. 15 is a schematic structural diagram of a network node according to an embodiment of the present disclosure. As shown in FIG. 15, an intermediate node 150 includes a receiving module 152 and a sending module 151. The intermediate node 150 may be one of a plurality of intermediate nodes on a protection trail.

The receiving module 152 is configured to, when a fault occurs on a working trail between a first end node and a second end node, receive a first protection switching request message from the first end node, where the protection trail of the working trail includes the first end node, the second end node, and at least one intermediate node.

The sending module 151 is configured to send the first protection switching request message to a downstream adjacent node of the intermediate node.

The receiving module 152 is configured to receive a second protection switching request message from the downstream adjacent node of the intermediate node.

The sending module 151 is configured to send a second protection switching request message to the first end node.

One overhead frame of the first protection switching request message and the second protection switching request message includes at least two overhead information groups, and the overhead information group includes a request type field, a request signal identifier field, and a bridge flag field.

The request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

Optionally, the overhead information group further includes a request flag field, where the request flag field is used to indicate whether the service corresponding to the service identifier indicated by the request signal identifier field requests the protection resource.

Optionally, the overhead information group further includes a reserved field, where the request type field occupies 4 bits, the request signal identifier field occupies 8 bits, the request flag field occupies 1 bit, the bridge flag field occupies 1 bit, and the reserved field occupies 2 bits.

Optionally, the request type field occupies 4 bits, the request signal identifier field occupies 10 bits, the request flag field occupies 1 bit, and the bridge flag field occupies 1 bit.

Optionally, the overhead information group further includes a reserved field, where the request type field occupies 4 bits, the request signal identifier field occupies 9 bits, the request flag field occupies 1 bit, the bridge flag field occupies 1 bit, and the reserved field occupies 1 bit.

Optionally, the overhead information group may further include a selector flag field, where the selector flag bit field is used to indicate whether the protection resource corresponding to the service identifier indicated by the request signal identifier field has been selected.

Optionally, the first protection switching request message and the second protection switching request message are APS messages.

In this embodiment of the present disclosure, in a process in which a node performs protection switching, because one overhead frame of a protection switching request message may include information about two overhead groups, to indicate overheads of two timeslots, an overhead field is fully used, so that protection switching efficiency is improved.

Figure 16:
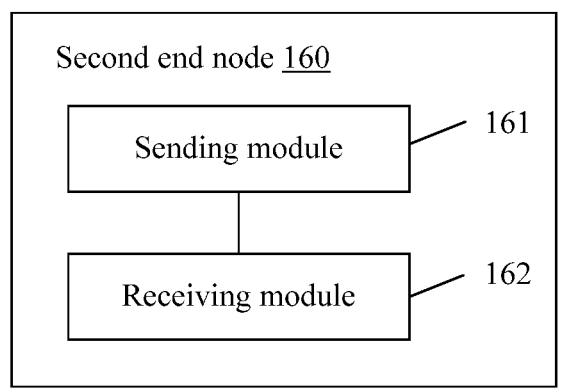
FIG. 16 is a schematic structural diagram of a network node according to an embodiment of the present disclosure.

FIG. 16 is a schematic structural diagram of a network node according to an embodiment of the present disclosure. As shown in FIG. 16, a second end node 160 includes a receiving module 162 and a sending module 161. The second end node 160 may be a common end node of a working trail and a protection trail.

The receiving module 162 is configured to, when a fault occurs on the working trail between a first end node and the second end node, receive a first protection switching request message from an intermediate node, where the protection trail of the working trail includes the first end node, the second end node, and at least one intermediate node.

The sending module 161 is configured to send a second protection switching request message to the intermediate node.

One overhead frame of the first protection switching request message and the second protection switching request message includes at least two overhead information groups, and the overhead information group includes a request type field, a request signal identifier field, and a bridge flag field.

The request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

Optionally, the overhead information group further includes a request flag field, where the request flag field is used to indicate whether the service corresponding to the service identifier indicated by the request signal identifier field requests the protection resource.

Optionally, the overhead information group further includes a reserved field, where the request type field occupies 4 bits, the request signal identifier field occupies 8 bits, the request flag field occupies 1 bit, the bridge flag field occupies 1 bit, and the reserved field occupies 2 bits.

Optionally, the request type field occupies 4 bits, the request signal identifier field occupies 10 bits, the request flag field occupies 1 bit, and the bridge flag field occupies 1 bit.

Optionally, the overhead information group further includes a reserved field, where the request type field occupies 4 bits, the request signal identifier field occupies 9 bits, the request flag field occupies 1 bit, the bridge flag field occupies 1 bit, and the reserved field occupies 1 bit.

Optionally, the overhead information group may further include a selector flag field, where the selector flag bit field is used to indicate whether the protection resource corresponding to the service identifier indicated by the request signal identifier field has been selected.

Optionally, the first protection switching request message and the second protection switching request message are APS messages.

In this embodiment of the present disclosure, in a process in which a node performs protection switching, because one overhead frame of a protection switching request message may include information about two overhead groups, to indicate overheads of two timeslots, the reserved field in an overhead field is fully used, so that protection switching efficiency is improved.

Figure 17:
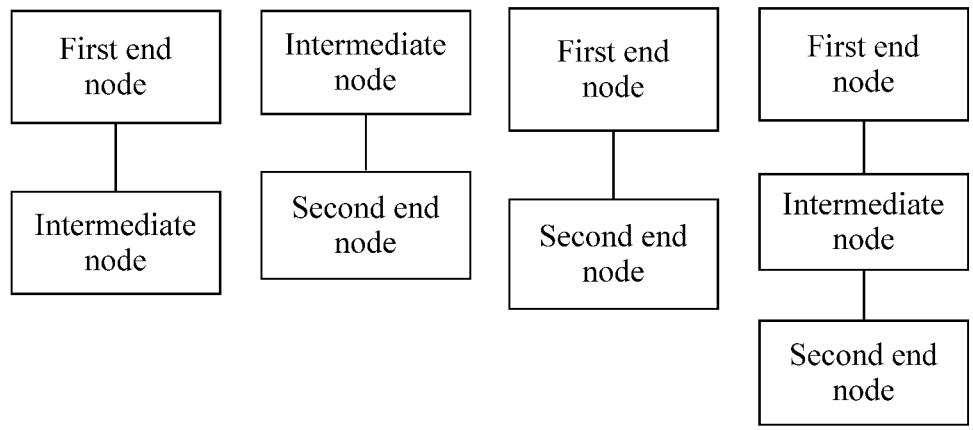
FIG. 17 is a schematic diagram of four structures of a network system according to an embodiment of the present disclosure.

FIG. 17 is a schematic diagram of four structures of a network system according to an embodiment of the present disclosure. As shown in FIG. 17, the system may include the first end node in the embodiment in FIG. 14 and the intermediate node in the embodiment in FIG. 15, or may include the intermediate node in the embodiment in FIG. 15 and the second end node in the embodiment in FIG. 16, or may include the first end node in the embodiment in FIG. 14, the intermediate node in the embodiment in FIG. 15, and the second end node in the embodiment in FIG. 16, or may include the first end node in the embodiment in FIG. 14 and the second end node in the embodiment in FIG. 16.

This embodiment of the present disclosure provides description by using an example in which the system includes the first end node, the intermediate node, and the second end node. There may be a plurality of intermediate nodes.

When a fault occurs on a working trail between the first end node and the second end node, the first end node sends a first protection switching request message to the intermediate node, where a protection trail of the working trail includes the first end node, the second end node, and at least one intermediate node.

The intermediate node receives the first protection switching request message from the first end node, and sends the first protection switching request message to the second end node.

The second end node receives the first protection switching request message from the intermediate node, and sends a second protection switching request message to the intermediate node.

The intermediate node receives the second protection switching request message from the second end node, and sends a second protection switching request message to the first end node.

The first end node receives the second protection switching request message from the intermediate node, and switches service data to the protection trail for transmission.

One overhead frame of the first protection switching request message and the second protection switching request message includes at least two overhead information groups, and the overhead information group includes a request type field, a request signal identifier field, and a bridge flag field.

The request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

In this embodiment of the present disclosure, in a process in which a node performs protection switching, because one overhead frame of a protection switching request message may include information about two overhead groups, to indicate overheads of two timeslots, an overhead field is fully used, so that protection switching efficiency is improved.

Figure 18:
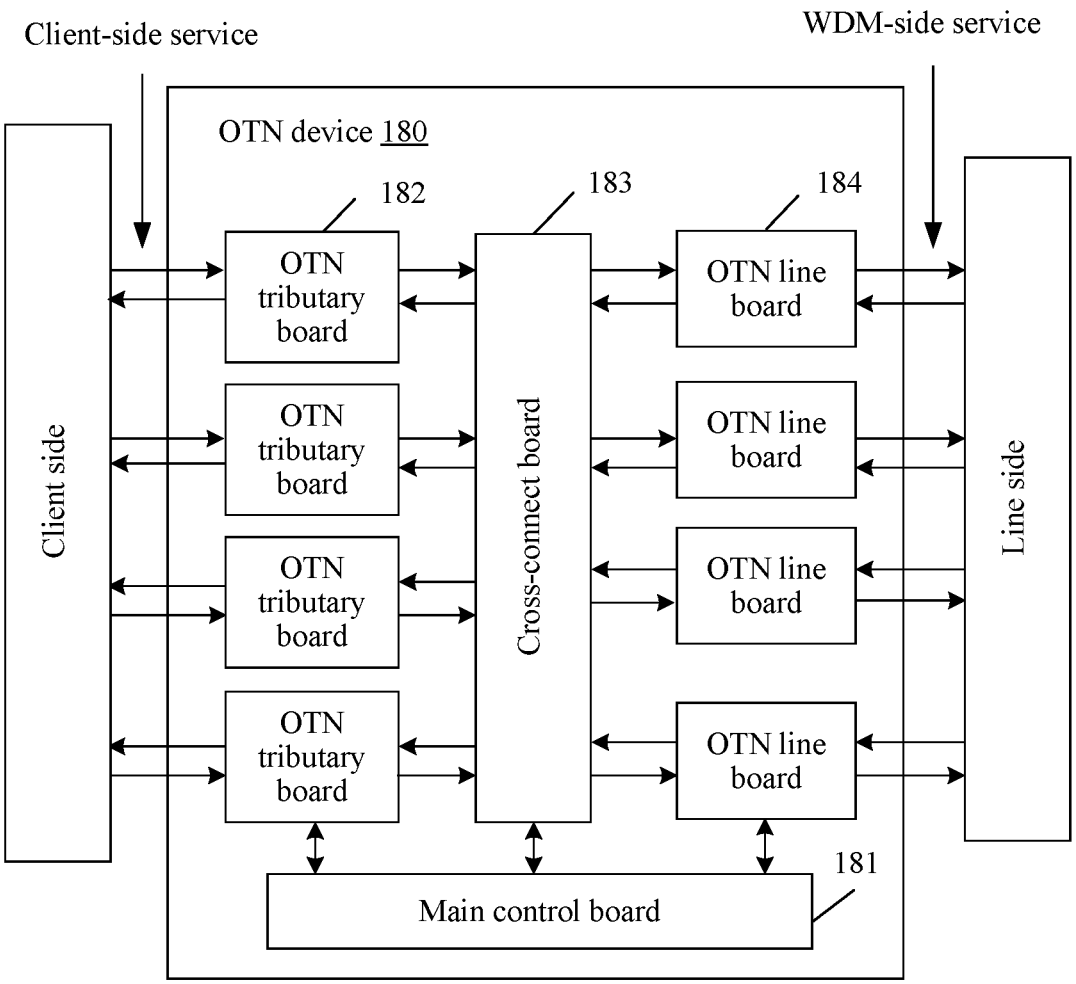
FIG. 18 is a schematic structural diagram of an OTN device according to an embodiment of the present disclosure.

FIG. 18 is a schematic structural diagram of hardware of an OTN device according to an embodiment of the present disclosure. As shown in FIG. 18, the OTN device includes a main control board 181, an OTN tributary board 182, a cross-connect board 183, and an OTN line board 184. A service transmission direction may be from a client side to a line side or from a line side to a client side. A service sent or received on the client side is referred to as a client-side service, and a service received or sent on the line side is referred to as a WDM-side service. Service processing procedures in the two directions are mutually reverse, and this embodiment provides description by using the direction from the client side to the line side as an example.

The main control board 181 is connected to the OTN tributary board 182, the cross-connect board 183, and the OTN line board 184 by using a bus or in a direct manner, and has a function of controlling and managing the OTN tributary board 182, the cross-connect board 183, and the OTN line board 184.

The OTN tributary board 182 implements encapsulating and mapping of a client service. There are a plurality of types of client services, for example, an ATM (Asynchronous Transfer Mode) service, an SDH (Synchronous Digital Hierarchy) service, an Ethernet service, a CPRI (Common Public Radio Interface) service, and a storage service. Specifically, the tributary board 182 is configured to receive a client service from the client side, encapsulates the received client service and maps the received client service to an ODU signal, and adds a corresponding OTN management monitoring overhead. On the OTN tributary board 182, the ODU signal may be a lower order ODU signal, for example, ODU0, ODU1, ODU2, ODU3, and ODUflex, and the OTN management monitoring overhead may be an ODU overhead. Different types of client services are encapsulated and mapped to different ODU signals in different manners.

The cross-connect board 183 implements a full cross-connection between a tributary board and a line board, and implements flexible cross-connection grooming of an ODU signal. Specifically, the cross-connect board may transmit an ODU signal from any tributary board to any line board, or transmit an OTU signal from any line board to any line board, or transmit a client signal from any tributary board to any tributary board.

The OTN line board 184 generates an OTU (Optical Channel Transport Unit) signal by using an ODU signal and sends the OTU signal to the line side. Before generating the OTU signal by using the ODU signal, the OTN line board 184 may multiplex a plurality of lower order ODU signals into a higher order ODU signal. Then, a corresponding OTN management monitoring overhead is added to the higher order ODU signal to form the OTU signal, and the OTU signal is sent to an optical transfer channel of the line side. On the OTN line board, the higher order ODU signal may be ODU1, ODU2, ODU3, ODU4, or the like, and the OTN management monitoring overhead may be an OTU overhead.

The main control board 181 may have a processor that executes pre-configured program code stored in a non-transitory computer readable medium, and may control any one or more boards of the OTN tributary board 182, the cross-connect board 183, or the OTN line board 184 to implement the following functions.

For example, when detecting that a fault occurs on a working trail between a first end node and a second end node, the OTN line board 184 or the OTN tributary board 182 sends a first protection switching request message to an intermediate node, where a protection trail of the working trail includes the first end node, the second end node, and at least one intermediate node. The OTN line board 184 or the OTN tributary board 182 receives a second protection switching request message from the intermediate node.

The cross-connect board 183 switches service data to the protection trail for transmission.

One overhead frame of the first protection switching request message and the second protection switching request message includes at least two overhead information groups, and the overhead information group includes a request type field, a request signal identifier field, and a bridge flag field.

The request type field indicates a fault type of the working trail, the request signal identifier field indicates a service identifier of a service that requests a protection resource, and the bridge flag field indicates whether the protection resource corresponding to the service identifier indicated by the request signal identifier field has been bridged.

Optionally, the overhead information group further includes a request flag field, where the request flag field is used to indicate whether the service corresponding to the service identifier indicated by the request signal identifier field requests the protection resource.

Optionally, the overhead information group further includes a reserved field, where the request type field occupies 4 bits, the request flag field occupies 1 bit, and the bridge flag field occupies 1 bit. The request signal identifier field may occupy 8 bits, 9 bits, or 10 bits, and a corresponding reserved field occupies 2 bits, 1 bit, or 0 bits.

In this embodiment of the present disclosure, because one overhead frame of an APS message may include information about two overhead groups, to indicate overheads of two timeslots, an overhead field is fully used, so that protection switching efficiency is improved.

Specifically, the OTN device 180 shown in FIG. 18 may implement the steps of the methods shown in FIG. 6a, FIG. 6b, FIG. 10a, FIG. 10b, FIG. 12a, and FIG. 12b. It should be noted that, although the OTN device 180 shown in FIG. 18 shows only the main control board 181, the OTN tributary board 182, the cross-connect board 183, and the OTN line board 184, in a specific implementation process, a person skilled in the art should understand that, the OTN device 180 further includes another component necessary for implementing normal running. Further, based on specific requirements, a person skilled in the art should understand that, the OTN device 180 may further include a hardware component for implementing additional function. In addition, a person skilled in the art should understand that, the OTN device 180 may include only a component necessary for implementing this embodiment of the present disclosure, but not necessarily include all the components shown in FIG. 18.

A person of ordinary skill in the art may understand that, each aspect of the present disclosure or a possible implementation of each aspect may be specifically implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation of each aspect may take a form of a computer program product, where the computer program product is computer-readable program code stored in a computer-readable medium.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

What is claimed is:

1. A protection switching method for shared mesh protection (SMP), comprising:

sending, by a first end node, a first protection switching request message to an intermediate node in response to a fault occurring on a working trail between the first end node and a second end node, wherein a protection trail of the working trail comprises the first end node, the second end node, and at least one intermediate node;

receiving, by the first end node, a second protection switching request message from the intermediate node; and switching service data to the protection trail for transmission in response to receiving the second protection switching request message;

wherein one overhead frame of each of the first protection switching request message and the second protection switching request message comprises at least two overhead information groups, and each of the at least two overhead information groups comprises a request type field, a request signal identifier field, and a bridge flag field; and wherein the request type field indicates a fault type of the working trail, wherein the request signal identifier field indicates a service identifier of a service that requests a protection resource, and wherein the bridge flag field indicates whether the protection resource corresponding to the service identifier indicated by the request signal identifier field has been bridged.

2. The method according to claim 1, wherein each of the at least two overhead information groups further comprises a request flag field, wherein the request flag field is indicates whether the service corresponding to the service identifier indicated by the request signal identifier field requests the protection resource.

3. The method according to claim 2, wherein each of the at least two overhead information groups further comprises a reserved field, wherein the request type field occupies 4 bits, the request signal identifier field occupies 8 bits, the request flag field occupies 1 bit, the bridge flag field occupies 1 bit, and the reserved field occupies 2 bits.

4. The method according to claim 2, wherein the request type field occupies 4 bits, the request signal identifier field occupies 10 bits, the request flag field occupies 1 bit, and the bridge flag field occupies 1 bit.

5. The method according to claim 2, wherein each of the at least two overhead information groups further comprises a reserved field, wherein the request type field occupies 4 bits, the request signal identifier field occupies 9 bits, the request flag field occupies 1 bit, the bridge flag field occupies 1 bit, and the reserved field occupies 1 bit.

6. The method according to claim 1, wherein the overhead information group further comprises a selector flag field, wherein the selector flag field indicates whether the protection resource corresponding to the service identifier indicated by the request signal identifier field has been selected.

7. The method according to claim 1, wherein the first protection switching request message and the second protection switching request message are each an automatic protection switching (APS) message.

8. The method according to claim 1, wherein each of the at least two overhead information groups further comprises a selector flag field, wherein the selector flag field indicates whether the protection resource corresponding to the service identifier indicated by the request signal identifier field has been selected.

9. The method according to claim 1, wherein the bridge flag field occupies 1 bit.

10. A first end node for shared mesh protection (SMP), comprising:
a cross-connect board;
a first optical transport network (OTN) communication board connected to the cross-connect board and configured to communicate on an OTN; and
a main control board connected to the cross-connect board and the first OTN communication board, wherein the main control board is configured to control the first OTN communication board to:
send a first protection switching request message to an intermediate node in response to a fault occurring on a working trail between the first end node and a second end node, wherein a protection trail of the working trail comprises the first end node, the second end node, and at least one intermediate node; and
receive a second protection switching request message from the intermediate node;
wherein the main control board is further configured to control the cross-connect board to switch service data to the protection trail for transmission in response to the second protection switching request message;
wherein one overhead frame of each of the first protection switching request message and the second protection switching request message comprises at least two overhead information groups, and each of the at least two overhead information groups comprises a request type field, a request signal identifier field, and a bridge flag field; and
wherein the request type field indicates a fault type of the working trail, wherein the request signal identifier field indicates a service identifier of a service that requests a protection resource, and wherein the bridge flag field indicates whether the protection resource corresponding to the service identifier indicated by the request signal identifier field has been bridged.

11. The first end node according to claim 10, wherein each of the at least two overhead information groups further comprises a request flag field, and wherein the request flag field indicates whether the service corresponding to the service identifier indicated by the request signal identifier field requests the protection resource.

12. The first end node according to claim 11, wherein each of the at least two overhead information groups further comprises a reserved field, wherein the request type field occupies 4 bits, the request signal identifier field occupies 8 bits, the request flag field occupies 1 bit, the bridge flag field occupies 1 bit, and the reserved field occupies 2 bits.

13. The first end node according to claim 11, wherein the request type field occupies 4 bits, the request signal identifier field occupies 10 bits, the request flag field occupies 1 bit, and the bridge flag field occupies 1 bit.

14. The first end node according to claim 11, wherein each of the at least two overhead information groups further comprises a reserved field, wherein the request type field occupies 4 bits, the request signal identifier field occupies 9 bits, the request flag field occupies 1 bit, the bridge flag field occupies 1 bit, and the reserved field occupies 1 bit.

15. The first end node according to claim 10, wherein the first protection switching request message and the second protection switching request message are automatic protection switching (APS) messages.

16. The first end node according to claim 10, wherein each of the at least two overhead information groups further comprises a selector flag field, wherein the selector flag field indicates whether the protection resource corresponding to the service identifier indicated by the request signal identifier field has been selected.

17. An intermediate node for shared mesh protection (SMP), comprising:
a cross-connect board;
one or more optical transport network (OTN) communication boards connected to the cross-connect board and configured to communicate on an OTN; and
a main control board connected to the cross connect board and the one or more OTN communication boards, wherein the main control board is configured to control the one or more OTN communication boards to:
receive a first protection switching request message from a first end node in response to a fault occurring on a working trail between the first end node and a second end node, wherein a protection trail of the working trail comprises the first end node, the second end node, and the intermediate node;
send the first protection switching request message to a downstream, adjacent, node of the intermediate node;
receive a second protection switching request message from the downstream adjacent node of the intermediate node; and
send a second protection switching request message to the first end node;
wherein one overhead frame of the first protection switching request message and the second protection switching request message comprises at least two overhead information groups, wherein each of the at least two overhead information groups comprises a request type field, a request signal identifier field, and a bridge flag field, wherein the request type field indicates a fault type of the working trail, wherein the request signal identifier field indicates a service identifier of a service that requests a protection resource, and wherein the bridge flag field indicates whether the protection resource corresponding to the service identifier indicated by the request signal identifier field has been bridged.

18. The intermediate node according to claim 17, wherein each of the at least two overhead information groups further comprises a request flag field, wherein the request flag field indicates whether the service corresponding to the service identifier indicated by the request signal identifier field requests the protection resource.

19. The intermediate node according to claim 17, wherein each of the at least two overhead information groups further comprises a reserved field, wherein the request type field occupies 4 bits, the request signal identifier field occupies 8 bits, the request flag field occupies 1 bit, the bridge flag field occupies 1 bit, and the reserved field occupies 1 bit or 2 bits.

20. The intermediate node according to claim 17, wherein the bridge flag field occupies 1 bit.

* * * * *